United States Patent [19]

Okamura et al.

[11] Patent Number: 5,559,962
[45] Date of Patent: Sep. 24, 1996

[54] DATA TRANSMISSION SYSTEM SELECTING BOTH SOURCE AND DESTINATION USING ADDRESSING MECHANISM

[75] Inventors: Yashikoi Okamura; Yasuo Kageyama; Takashi Suzuki; Junichi Fujimori; Takeshi Funada, all of Shizuoka-ken, Japan

[73] Assignee: Yamaha Corporation, Hamamatsu, Japan

[21] Appl. No.: 487,660

[22] Filed: Jun. 7, 1995

Related U.S. Application Data

[63] Continuation of Ser. No. 161,085, Dec. 3, 1993, abandoned, which is a continuation of Ser. No. 594,004, Oct. 9, 1990, abandoned.

[30] Foreign Application Priority Data

Oct. 9, 1989 [JP] Japan .................................. 1-263666
Oct. 9, 1989 [JP] Japan .................................. 1-263667
Oct. 27, 1989 [JP] Japan .................................. 1-281190

[51] Int. Cl.⁶ .................................................. G06F 13/00
[52] U.S. Cl. .................. 395/200.06; 395/200.05; 395/200.16; 395/290; 395/293; 340/825.06; 340/825.07; 340/825.52; 364/DIG. 1; 364/230.4; 364/229.2; 364/240.2; 364/243.1; 364/246.11
[58] Field of Search ................... 395/200.05, 200.07, 395/200.12, 200.15, 200.16, 290, 800, 200.01, 200.06, 200.08, 280, 287, 293, 873, 431, 438, 484; 340/825.06, 825.07, 825.52

[56] References Cited

U.S. PATENT DOCUMENTS

| | | | |
|---|---|---|---|
| 3,413,606 | 11/1968 | Cichanowicz et al. | 340/825.07 |
| 4,100,533 | 7/1978 | Napolitano et al. | 340/825.22 |
| 4,131,881 | 12/1978 | Robinson | 340/825.53 |
| 4,237,534 | 12/1980 | Felix | 395/303 |
| 4,466,063 | 8/1984 | Segarra et al. | 395/200.2 |
| 4,494,192 | 1/1985 | Lew et al. | 395/292 |
| 4,495,573 | 1/1985 | Ballegeer et al. | 395/290 |
| 4,760,572 | 7/1988 | Tomikawa | 370/94 |
| 4,792,947 | 12/1988 | Takiyasu et al. | 370/86 |
| 4,805,094 | 2/1989 | Oye et al. | 395/250 |
| 4,888,684 | 12/1989 | Lilja et al. | 395/289 |
| 4,947,368 | 8/1990 | Donaldson et al. | 395/325 |
| 4,998,245 | 3/1991 | Tanaka et al. | 370/85.1 |
| 5,117,350 | 5/1992 | Parrish et al. | 395/401 |
| 5,132,680 | 7/1992 | Tezuka et al. | 340/825.08 |
| 5,163,132 | 11/1992 | Dulac et al. | 395/275 |
| 5,195,185 | 3/1993 | Marenin | 395/275 |

FOREIGN PATENT DOCUMENTS

| | | |
|---|---|---|
| 54-148403 | 11/1979 | Japan . |
| 56-146342 | 11/1981 | Japan . |
| 62-161234 | 7/1987 | Japan . |
| 62-237835 | 10/1987 | Japan . |

OTHER PUBLICATIONS

William Stallings, Data and Computer Communications 1988, pp. 220–221.
"Audio Frame"—WaveFrame Corporation, The Digital Audio Workstation, p. 7 (Oct.1987).
"VLSI Signal Processing III", IEEE Press, ch. 28 (1988).
"Visualization Machine" (U.S. Translation only of p. 76, line 7 to p. 77, line 7.

*Primary Examiner*—Lance Leonard Barry
*Attorney, Agent, or Firm*—Burns, Doane, Swecker & Mathis, LLP

[57] ABSTRACT

A data transmission system includes a main controlling unit for producing pieces of address information, each piece of address information being indicative of a first address for a data source and a second address for a destination. The data transmission system further includes a plurality of component units assigned individual addresses, respectively, and a timing controlling unit sequentially supplying the pieces of address information to the component units at predetermined timings. In operation, one of the component units with the individual address matched with the first address serves as the data source and another component unit with the individual address matched with the second address serves as the destination communicating with the data source.

12 Claims, 19 Drawing Sheets

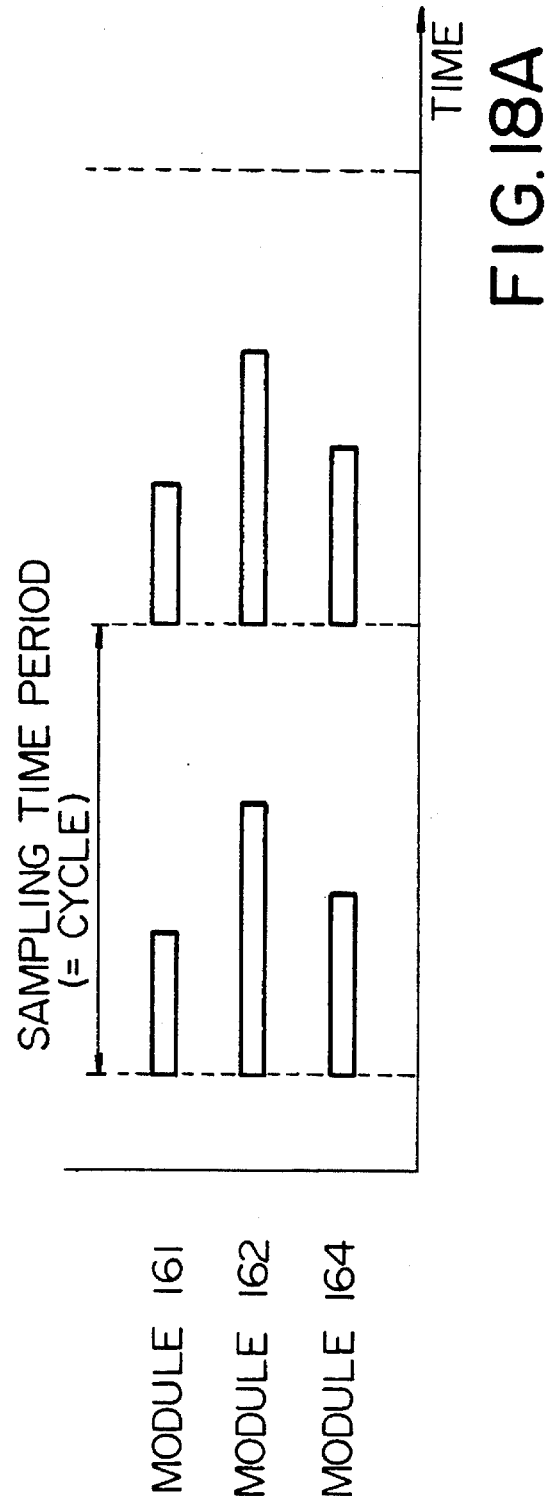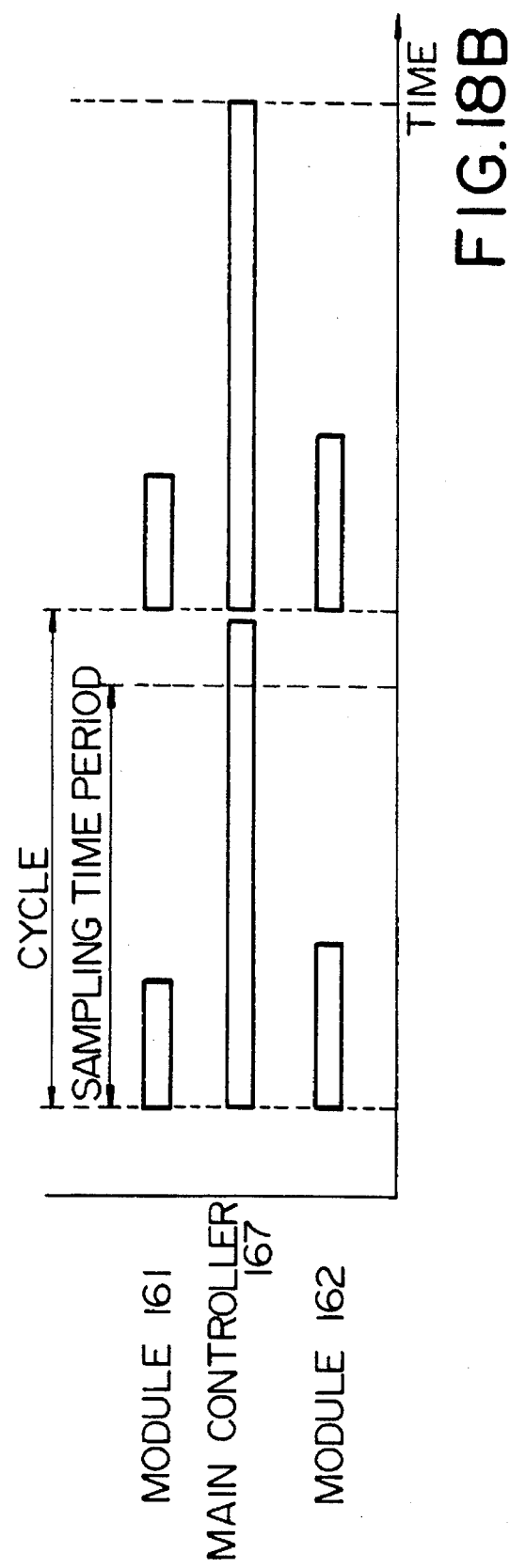

1

DATA TRANSMISSION SYSTEM SELECTING BOTH SOURCE AND DESTINATION USING ADDRESSING MECHANISM

This application is a continuation of Application Ser. No. 08/161,085, filed Dec. 3, 1993, now abandoned, which in turn is a continuation of Application Ser. No. 07/594,004, filed Oct. 9, 1990, now abandoned.

FIELD OF THE INVENTION

This invention relates to a data transmission system and, more particularly, to a high-speed data transmission system shared between a plurality of data sources.

DESCRIPTION OF THE RELATED ART

Various data transmission systems have been proposed for digital data transmission, and FIG. 1 shows one of the data transmission systems for serial data. The data transmission system has a serial data bus group A0 to An, another serial data bus group B1 to Bn and a matrix switching network 1 selectively providing interconnections therebetween.

In some general purpose computer systems is employed a data transmission system which is called as "VME bus" corresponding to 821 bus of the International Electrotechnical Commission (IEC) standard and to P1014/D1.2 of the International Society of Electrical and Electronic Engineers (IEEE) standard. The Virtual Machine Environment (VME) bus system directly interconnects component boards and is of an asynchronous communication system. In the asynchronous communication system, the data source unit needs to wait until receipt of acknowledgment indicative of completion of the data transmission supplied from the destination, but the system can propagate various data formats.

However, the first data transmission system fabricated with the matrix switching network I inherently suffers from a low speed, and a large number of bus lines make the matrix switching network complex. Such a complex matrix switching network is so expensive that the data transmission system is not desirable in view of the production cost of a computer system.

The data transmission timing VME is uncertain in the VME bus system and is, therefore, ineligible for a real time processing such as, for example, an audio message. If the VME bus system is used for the real time processing accompanied with a transmission of digital sound data, the sound data need to be rearranged along the lapse of time, and, therefore, an additional software is necessary for a retrieval of the real sound. This results in that the total load of a central processing unit is increased, and the VME bus system is uneconomical in such a real time processing.

SUMMARY OF THE INVENTION

It is therefore an important object of the present invention to provide a data transmission system which is responsive to a high speed serial data transmission.

It is also an important object of the present invention to provide a timing controlling unit which is incorporated in the data transmission system for the high speed serial data transmission.

In accordance with one aspect of the present invention, there is provided a data transmission system comprising a) a main controlling unit for producing pieces of address information, each piece of address information being indicative of a first address for a data source and a second address for a destination, b) a plurality of component units assigned individual addresses, respectively, and having respective data storages, and c) a timing controlling unit storing the pieces of address information and sequentially supplying the pieces of address information to the component units at predetermined timings, in which one of the component units with the individual address matched with the first address serves as the data source and in which another component unit with the individual address matched with the second address serves as the destination communicating with the data source.

In accordance with another aspect of the present invention, there is provided a timing generating unit provided in association with data rewriting means for producing pieces of address information each indicative of a first address of a data source and a second address of a destination; the pieces of address information being grouped into at least first and second groups, comprising: a) a first memory unit alternatively entering a write-in mode and a read-out mode of operation and storing the pieces of address information of one of the first and second groups in a rewriteable manner; b) a second memory unit alternatively entering a write-in mode and a read-out mode of operation and storing the pieces of address information of the other of the first and second groups in a rewriteable manner; c) address information generating means for sequentially producing a series of memory addresses for the read-out mode of operation; and d) switching means coupled at one end thereof to the first and second memory units and at the other ends thereof to the data rewritting means and the address information generating means and allowing one of the first and second memory units to enter the write-in mode of operation for storing the pieces of address information fed from the data rewriting means, the switching means further allowing the other of the first and second memory units to enter the read-out mode of operation for sequentially delivering the pieces of address information in the presence of the memory addresses.

BRIEF DESCRIPTION OF THE DRAWINGS

The features and advantages of a data transmission system and a timing controlling unit according to the present invention will be more clearly understood from the following description taken in conjunction with the accompanying drawings in which:

FIGS. 18A and 18B are views showing the data transmissions completed within and prolonged over the single sampling time period;

DESCRIPTION OF THE PREFERRED EMBODIMENTS

First Embodiment

Figure 1:
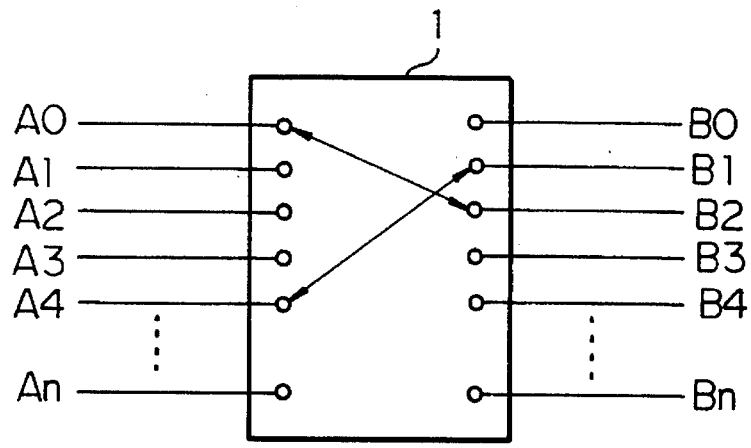
FIG. 1 is a schematic view showing a prior art serial data transmission system.
Figure 2:
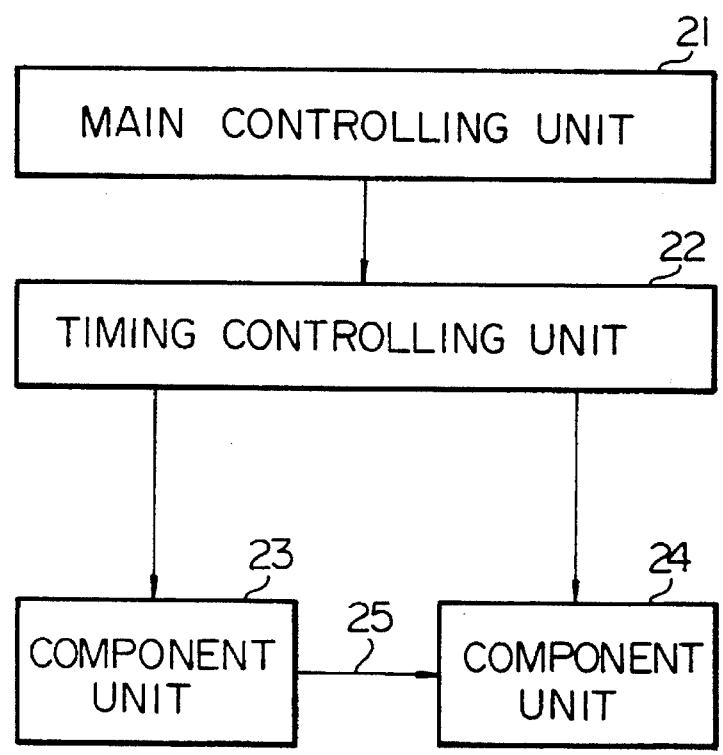
FIG. 2 is a block diagram showing the arrangement of a data transmission system according to the present invention.

Referring first to FIG. 2 of the drawings, a data transmission system embodying the present invention largely comprises a main controlling unit 21, a timing controlling unit 22 and two component units 23 and 24 communicable with one another through a data bus 25 under the control of the timing controlling unit 22. Although more than two component units are coupled to the data bus 25, only two component units 23 and 24 are shown in FIG. 2 for the sake of simplicity. In the following description, the component unit 23 behaves as a data source, and the component unit 24 serves as a destination.

The main controlling unit 21 produces pieces of address information and supplies a multi-bit address signal indicative of each piece of address information to the timing controlling unit 22. The multi-bit address signal is formed into a data format including a first section occupied by a first address of a data source and a second section occupied by a second address of a destination. A series of the multi-bit address signals are sequentially supplied from the main controlling unit 21 to the timing controlling unit 22 and form an address queue in the timing controlling unit 22. While new multi-bit address signals enter the address queue, the multi-bit address signals previously supplied are sequentially read out from the address queue and supplied to the component units including the units 23 and 24 at predetermined time intervals. Whenever the first and second sections of the multi-bit address signal designate the component units 23 and 24 as the data source and the destination, respectively, and data are transmitted from the component unit 23 to the component unit 24. Since the multi-bit address signals are managed to be sequentially released from the address queue at predetermined timings, the data transmission is repeated at a high speed, and a large amount of data information is transmitted from the data source to the destination in synchronization with another processing. Namely, if the timing controlling unit 21 repeats the designation of the component units 23 and 24 take place, the data transmission is carried out at a high speed. If, on the other hand, the designation of the component units 23 and 24 takes place at a predetermined time interval adjusted to a time duration of a periodical data processing, the data transmission is carried out in synchronization with the periodical data processing, and, accordingly, the subsequent stage is given on a real time basis.

Figure 3:
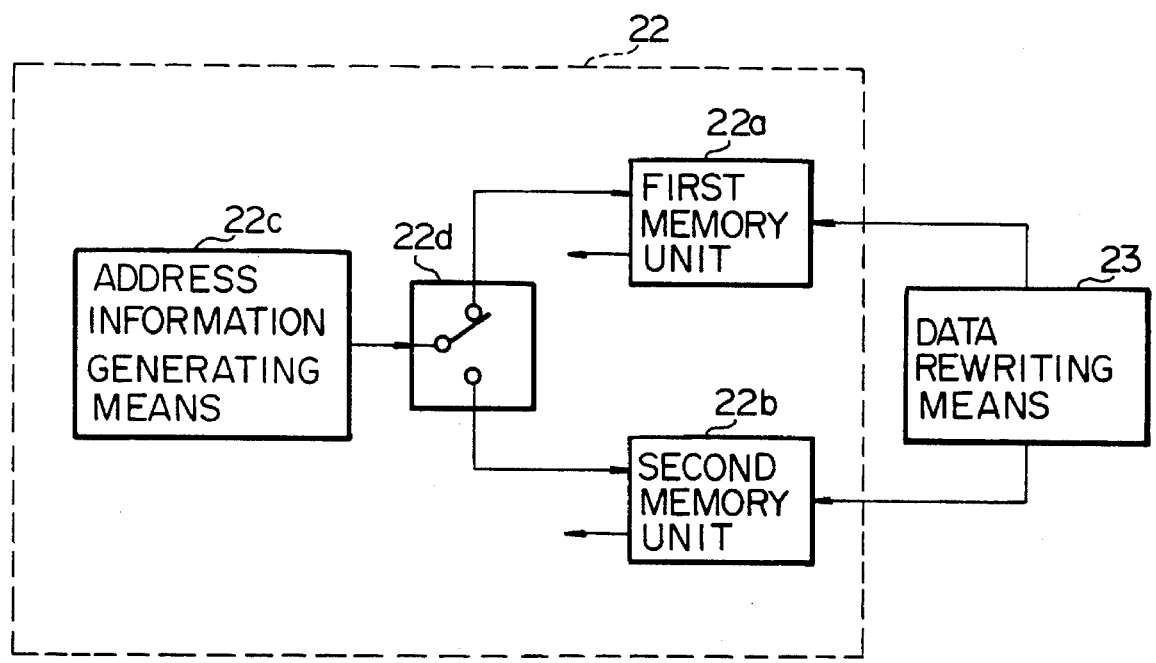
FIG. 3 is a block diagram showing the arrangement of a timing controlling unit incorporated in the data transmission system shown in FIG. 2.

Turning to FIG. 3 of the drawings, the timing controlling unit 22 comprises a first memory unit 22a having a plurality of memory locations respectively assigned addresses, a second memory unit 22b having a plurality of memory locations respectively assigned addresses, address information generating means 22c operative to produce an address signal indicative of one of the addresses and increment the address, and switching means for alternately coupling the memory units 22a and 22b to the address information generating means 22c. The first and second memory units 22a and 22b are further coupled to data rewriting means 23 for selectively supplying new data to one of the memory units 22a and 22b. The data rewriting means may be implemented by the main controlling unit 21, and the address queue is formed in the first and second memory units 22a and 22b.

The timing controlling unit 22 thus arranged behaves as follows. While data bits in one of the memory units 22a and 22b are rewritten by the data rewriting means, the other memory unit is supplied with the address signal sequentially incremented and data bits are read out therefrom. The data bits thus sequentially read out are formed into the multi-bit address signal having the first and second sections, and two of the component units are designated as a data source and a destination. Since the address information generating means 22c and the data rewriting means are alternately coupled to the first and second memory units 22a and 22b, the timing controlling unit 22 can successively supply the multi-bit address signals to the component units while receiving new multi-bit address signals.

Figure 4:
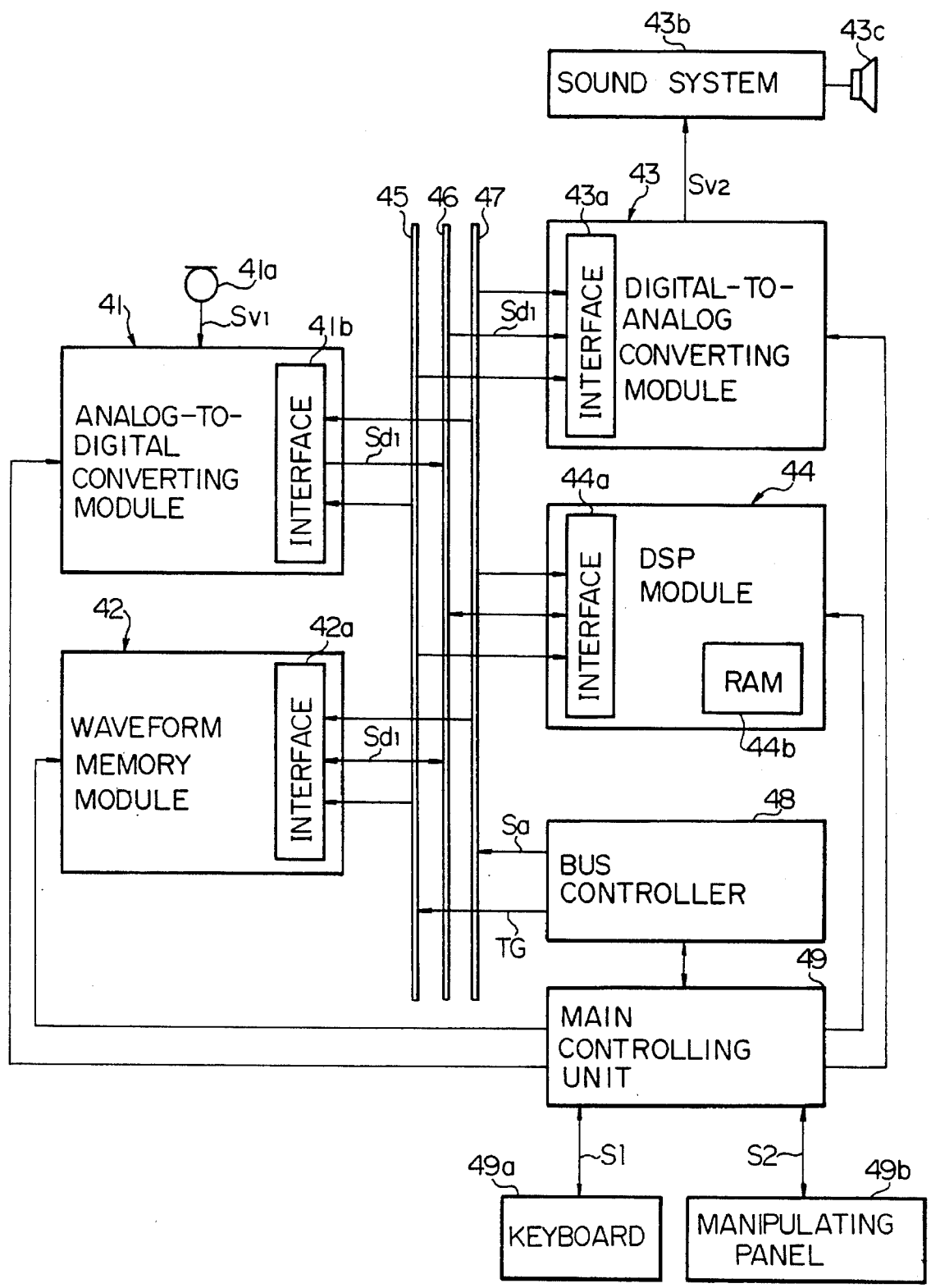
FIG. 4 is a block diagram showing the arrangement of a sound synthesizing system incorporating the data transmission system shown in FIG. 2.

Description is hereinbelow made on a sound synthesizing system which has the data transmission system shown in FIG. 2. FIG. 4 shows the arrangement of the sound synthesizing system comprising an analog-to-digital converting module 41 coupled to a microphone unit 41a and having an interface 41b, a waveform memory module 42 having an interface 42a, a digital-to-analog converting module 43 having an interface 43a and coupled to a sound system 43b associated with a loud speaker system 43c, and a DSP (Digital Signal Processor) module 44 having an interface 44a and a random access memory 44b. A control bus 45, a data bus 46 and an address bus 47 are shared between those modules 41 to 44, and predetermined individual addresses are assigned the modules 41 to 44, respectively. The bus controller 48 activates one of the modules 41 to 44 as a data source and another module as a destination. Namely, when the bus controller 48 supplies the address bus 47 an address signal Sa representative of first and second addresses of the data source and the destination in synchronization with a timing signal TG, two of the modules 41 to 44 acknowledge the designation of the data source and the destination with the first and second addresses and a data transmission is carried out therebetween through the data bus 46. Thus, the bus controller 48 manages the occupation of the data bus 46 and, therefore, serves as the timing controlling unit 22 shown in FIGS. 2 and 3. In this instance, the modules 41 to 44 are equivalent to the component units including the units 23 and 24.

The bus controller 48 is coupled to a main controlling unit 49 which is associated with a keyboard 49a and a manipulating panel 49b. The keyboard 49a produces a various performance signals S1 on the basis of a performance by a player or an automatic performance by an automatic performance system, and each of the musical signals is indicative of a piece of musical information. On the manipulating panel 49b are arranged a plurality of switching elements each producing an instruction signal S2 indicative of a user's instruction such as selecting a tone color. The main controlling unit 49 has a central processing unit (not shown) as well as memory unit (not shown) and not only directly controls the modules 41 to 44 but also supervises the data transmission therebetween with the bus controller 48.

The modules 41 to 44 respectively achieve predetermined tasks, and description is briefly made on those tasks:. The microphone unit 41a changes a sound into an analog electric sound signal Sv1 and supplies it to the analog-to-digital converting unit 41, and the analog-to-digital converting unit 41 samples the analog electric sound signal Sv1 at predetermined time intervals, then the sampled discrete voltage levels are sequentially converted into a series of digital sound signals Sd1. The digital sound signals Sd1 are supplied to the data bus 46 upon designation with the address signal Sa. The waveform memory module 42 can memorize the digital sound signals Sd1 inputted from the data bus 42 so that various waveforms inherent to musical instruments such as, for example, a piano, a harpsicord and so forth can be memorized in the waveform memory module 42, and each waveform is retrieved depending upon the performance signal S1.

The digital-to-analog converting module 43 is supplied with the digital sound signals Sd1 and converts them to the analog electric sound signal Sd1, then supplying the analog electric sound signal Sd1 to the sound system 43b. The sound system 43b increases the analog electric sound signal Sd1 in magnitude and, then, supplies the analog electric sound signal Sd1 thus amplified to the loud speaker system 43c. The DSP module 44 receives the digital sound signal Sd1 and executes digital operations for modifying waveform, mixing waveforms, adding reverberation, chorus effect, vibrato effect and so on. Thus, the DSP module 44 serves as a mixer, equalizer and some effecters.

Figure 5:
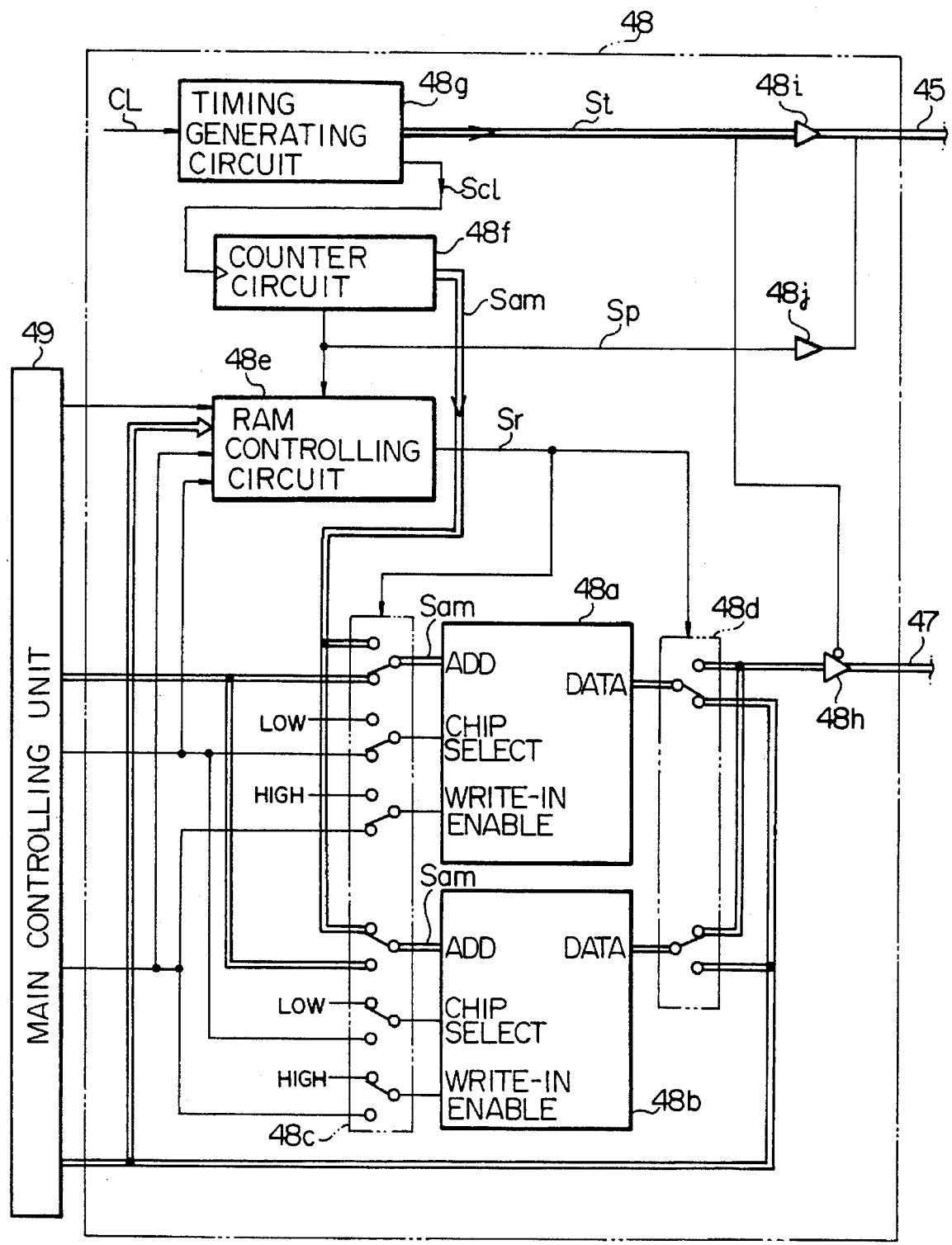
FIG. 5 is a block diagram showing the arrangement of a bus controller incorporated in the sound synthesizing system shown in FIG. 4.

The bus controller 48 is illustrated in detail in FIG. 5 of the drawings. The bus controller 48 is coupled to the main controlling unit 49 and supplies the timing signal TG and the address signal Sa to the control bus 45 and the address bus 47, respectively. The bus controller 48 comprises a first random access memory unit 48a and a second random access memory unit 48b, and each of the random access memory units 48a and 48b has an address port (abbreviated as "ADD") supplied with an address signal Sam indicative of a memory address of either random access memory unit 48a or 48b, a data port (designated by "DATA"), a chip select terminal and a write-in enable terminal. The random access memory unit 48a or 48b is activated in the presence of a chip select signal of an active low level supplied to the chip select terminal. If a write-in enable signal of an inactive high level is supplied to the write-in enable terminal, data bits are read out from a memory cell groups indicated by an address signal Sam fed to the address port of the activated memory unit 48a or 48b and supplied the data port thereof; however, new data bits supplied to the data port are written into a memory cell group indicated by the address signal Sam in the presence of the write-in enable signal of the active low level. If the chip select signal remains in the inactive high level, the data port enters a high-impedance state, and, therefore, no communication is established between the memory cells and an external unit or circuit.

The bus controller 48 further comprises first and second switching units 48c and 48d each having a plurality of switching elements, and the first and second switching units 48c and 48d are responsive to a controlling signal Sr fed from a random access memory (RAM) controlling circuit 48e. Namely, if the first and second switching units 48c and 48d are changed to the state shown in FIG. 5, the first switching unit 48c allows the main controlling unit 49 to rewrite the data bits stored in the first random access memory unit 48a freely. However, since the second random access memory unit 48b is supplied at the chip select terminal with the active low level and at the write-in control terminal with the inactive high voltage level, the second random access memory unit 48b is allowed read-out operation only. Responsive to the address signal Sam fed from a counter circuit 48f and the address signal Sam is indicative of the memory address and sequentially incremented by clock signal Sc1 fed from a timing generating circuit 48g, the second random access memory unit 48b provides data bits to the output port thereof, and the data bits are indicative of the first and second addresses of the data source and the destination. The second switching unit 48d relays the data bits thus read out to a tri-state buffer circuit 48h which in turn transfers the data bits to the address bus 47 as the address signal Sa indicative of the first address and the second address.

If, on the other hand, the first and second switching units 48c and 48d are changed from the states shown in FIG. 5 to the opposite states or all of the switching elements of the units 48c and 48d provide respective signal paths to the other contacts, the second random access memory unit 48b is communicable with the main controlling unit 49, and the first random access memory unit 48a supplies the data bits rewritten by the main controlling unit 49 to the address bus 47 in synchronization with the address signal Sam fed from the counter circuit 48f.

As described hereinbefore, the timing generating circuit 48g supplies the clock signal Sc1 to the counter circuit 48f for incrementing the memory address. The timing generating circuit 48g is further operative to define a series of time slots. Namely, a system clock signal CL is supplied to the timing generating circuit 48g, and the timing generating circuit 48g produces a time slot controlling signal St (which forms a part of the timing signal TG in FIG. 3) on the basis of the system clock signal CL. The time slot controlling signal St is fed through a buffer circuit 48i to the control bus 45, and each time slot starts with the time slot controlling signal St. Each time slot is defined as "a unit of time interval for a single data transmission" carried out in the sound synthesizing system shown in FIG. 4. Each module 41, 42, 43 or 44 is responsive to the time slot controlling signal St and occupies the data bus 46 over the single time slot for a data transmission. The time slot controlling signal St is further supplied to the tri-state buffer circuit 48h for synchronous operation between the time slot and the address signal Sa. Detailed description will be made hereinlater.

Since the clock signal Sc1 is delivered at every time slot, the counter circuit 48f is incremented in synchronization with the time slot. The counter circuit 48f starts at value "0" and increases the value to "N". When the value reaches "N", the counter circuit 48f returns to value "0" and repeats the counting operation between values "0" and "N". Each value from "0" to "N" is indicative of the memory address assigned to a group of the memory cells incorporated in either random access memory unit 48a or 48b, and, therefore, the address signal Sam circulates between the address "0" and the address "N". Upon returning to value "0" the counter circuit 48f produces a sampling timing signal Sp which is transferred through a buffer circuit 48j to the control bus 45 for defining a single sampling time period. The sampling time period consists of "N+1" time slots and is occupied by a single transfer operation consisting of a plurality of the data transmissions. In this instance, the sampling timing signal Sp further defines a single sampling operation for the analog electric sound signal Sv1, and, therefore, the data transfer operation is equivalent in time length to the single sampling operation for the analog electric sound signal Sv1. Detailed description will be hereinlater made.

The sampling timing signal Sp is further supplied to the RAM controlling circuit 48e, and the RAM controlling circuit 48e supplies the controlling signal Sr to the first and second switching units 48c and 48d in the presence of the sampling timing signal Sp. With the controlling signal Sr, the first and second switching units 48a and 48b changes the signal paths between aforementioned two different states, and the first and second random access memory units 48a and 48b are alternatively coupled to the main controlling unit 49 and the address bus 47. In other words, while one of the first and second random access memory units 48a and 48b is rewritten by the main controlling unit 49 over a single sampling period, the other random access memory unit delivers the data bits to the address bus 47 in synchronization with the address signal Sam fed from the counter circuit 48f. Thus, the RAM controlling circuit 48e controls the alternative operations witch the controlling signal Sr. The controlling signal Sr is never delivered from the RAM controlling circuit 48e on the way to the termination of a sampling time period. The controlling signal Sr is delivered at completion of a sampling period only.

In this instance, the first and second random access memory units 48a and 48b serve as the first and second memory units 22a and 22b, the first and second switching units 48c and 48d and the RAM controlling circuit 48e form in combination the switching means 22d, and the timing generating circuit 48g and the counter circuit 48f as a whole constitute the address information generating means 22c.

Description is made on the behavior of the sound synthesizing system in detail. First, the RAM controlling circuit 48e is assumed to change the first and second switching units 48a and 48b to the states shown in FIG. 5 with the controlling signal Sr. In this situation, the counter circuit 48f returns to value "0", and a sampling time period restarts in the presence of the sampling timing signal Sp. The main controlling unit 49 allows the chip select signal and the write-in enable signal to go down to the active low levels, respectively, and respectively supplies the address signal Sam and the data bits to the address port and the data port of the first random access memory unit 48a. The address signal Sam is incremented from address "0" to address "N", and the data bits are rewritten in synchronization with the address. Then, a plurality of new data bit groups are written into the first random access memory unit 48a by the main controlling unit 49, and each data bit group provides addresses assigned two of the modules 41 to 44 which occupies the data bus 46 over a single time slot as the data source and the destination. When the write-in operation is completed, the first random access memory unit 48a maintains pieces of address information each indicative of the first and second addresses used in the next sampling period. While the write-in operation is carried out, a plurality of data bit groups are sequentially read out from the second random access memory unit 48b in synchronization with the address signal Sam fed from the counter circuit 48f.

When the counter circuit 48f reaches the value "N" and returns to "0", the sampling timing signal Sp is fed from the counter circuit 48f to not only the control bus 45 but also the RAM controlling circuit 48e. The RAM controlling circuit 48e change the first and second switching units 48c and 48d so that the first random access memory unit 48a is coupled to the address bus 47 through the second switching unit 48d and the tri-state buffer circuit 48d. Since the chip select terminal and the write-in enable terminal of the first random access memory unit 48a are supplied with the active low level and the inactive high level, respectively, the first random access memory unit 48a is responsive to the address signal Sam fed from the counter circuit 48f for a read-out operation. First, the address signal Sam indicative of the address "0" is fed to the address port of the first random access memory unit 48a, and the first data bit group is read out from the memory cells assigned the address "0" to the data port. The data bit group thus read out to the data port is representative of the first and second addresses identical with two individual addresses assigned the modules 41 to 44, and the address signal Sa indicative of the first and second addresses is supplied from the tri-state buffer circuit 48h to the address bus 47 in synchronization with the time slot controlling signal St serving as the timing signal TG. The counter circuit 48f increments the memory address indicated by the address signal Sam, and the second data bit group is read out from the first random access memory unit 48a. The second data bit group is also indicative of two individual addresses of the modules designated as the next data source and the next destination, and the next address signal Sa is fed from the tri-state buffer circuit 48h to the address bus 47 in synchronization with the time slot controlling signal St. Thus, the data bit groups are sequentially read out from the first random access memory unit 48a, and the address signals Sa successively propagate on the address bus 47 for controlling the data transmissions. While the first random access memory unit 48a provides a series of the address groups to the modules 41 to 44, the main controlling unit 49 rewrites the data bits in the second random access memory unit 48b. The RAM controlling circuit 48e allows the main controlling unit 49 and the RAM controlling circuit 48e to alternately rewrite and read out the data bit groups memorized in the first and second random access memory units 48a and 48b, and, therefore, the bus controller 48 sequentially designates two of the modules 41 to 44 as the data source and the destination for data transmission.

Each of the modules 41 to 44 monitors the address signal Sa to see whether or not the bus controller 48 designates as a data source or a destination. If one of the modules 41 to 44 acknowledges itself as the data source or the destination, the designated module 41, 42, 43 or 44 participates the data transmission under the supervision of the bus controller 48.

Figure 6:
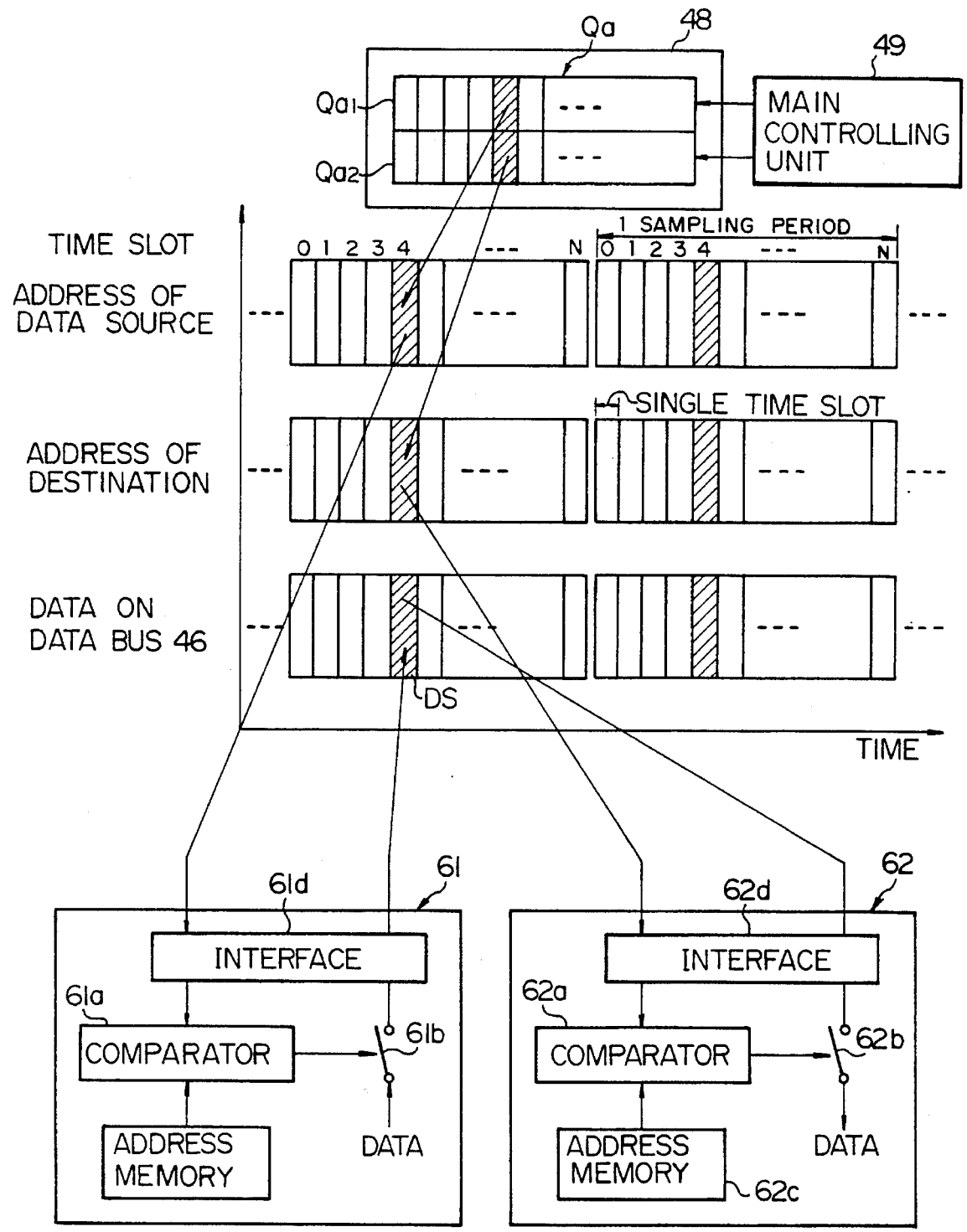
FIG. 6 is a view showing the data transmission between a data source and a destination under the control of the bus controller shown in FIG. 5.

The data transmission is described in detail with reference to FIG. 6 of the drawings. Assuming now that the pieces of address information are in the address queue Qa produced in the bus controller 48, every block in the upper row Qa1 is paired with the corresponding block in the lower row Qa2, and each block pair indicates the piece of address information. Each piece of address information is indicative of a first address of a data source 61 (represented by the block in the upper row Qa1) and a second address of a destination 62 (represented by the block in the lower row Qa2), and the first and second addresses are represented by the data bits or the data bit group memorized in either first or second random access memory unit 48a or 48b. In the following description, one of the analog-to-digital converting module 41, the waveform memory module 42 and the digital signal processor (DSP) module 44 is designated as the data source, and one of the digital-to-analog converting module 43, the waveform memory module 42 and the DSP module 44 serves as the destination.

When the sequential read-out operation reaches the hatched blocks in the address queue Qa, the piece of address information is read out to the address bus 47 and the first and second addresses are respectively transferred to the modules 41 and 44 in the time slot "4". The address of the data source is distributed to all of the modules 41 to 44, and the modules 41 to 44 compares the address of the data source with the individual addresses assigned thereto. Only the module serving as the data source 61 finds that the first address to be distributed is matched with the individual address assigned thereto through the comparison carried out by a component comparator 61a, and the component comparator 61a closes a component switching element 61b. Then, a data signal indicative of data DS to be requested is put on the data bus 46.

The second address of the destination 62 is also distributed to all of the modules 41 to 44 within the same time slot "4" and is compared with the individual addresses assigned the respective modules 41 to 44. In another module serving as the destination 62, a component comparator 62a allows a component switching element 62b to be close upon matching the second address of the destination 62 with the individual address to be memorized in an address memory 62c. The data signal indicative of the requested data DS supplied from the data bus 46 passes through an interface 62d. Thus, the bus controller 48 sequentially designates two of the modules 41 to 44 as the data source 61 and the destination 62 in every time slot and, accordingly, allows various data to be transmitted through the single data bus 46.

As described hereinbefore, every sampling time period consists of the time slots "0" to "N" and is equal in time length to the sampling operation for the analog electric sound signal Sv1. If the data transmission for the digital sound signal Sd1 is fixedly assigned to the time slot "4", the digital sound signal Sd1 is transmitted from the analog-to-digital converting module 41 on a real time basis, and no rearrangement is needed for the data to be transmitted after receipt at the destination 62.

If a large amount of data are requested to be transmitted from the data source 61 to the destination 62 at a high speed, a plurality of time slots are assigned to the data source 61 and the destination 62 in every sampling period. Since the data transmission speed is in proportion to the number of the time slots to be assigned in every sampling period, a large amount of data are transmitted from the data source 61 to the destination 62 within a relatively short time period. In other words, the data transmission speed is adjustable to an arbitrary level by rearranging the pieces of address information in the address queue Qa. Thus, a wide variety of operation is carried out by the bus controller 48, and the variation is merely achieved by changing the data bits stored in the first and second random access memory units 48a and 48b.

Figure 7:
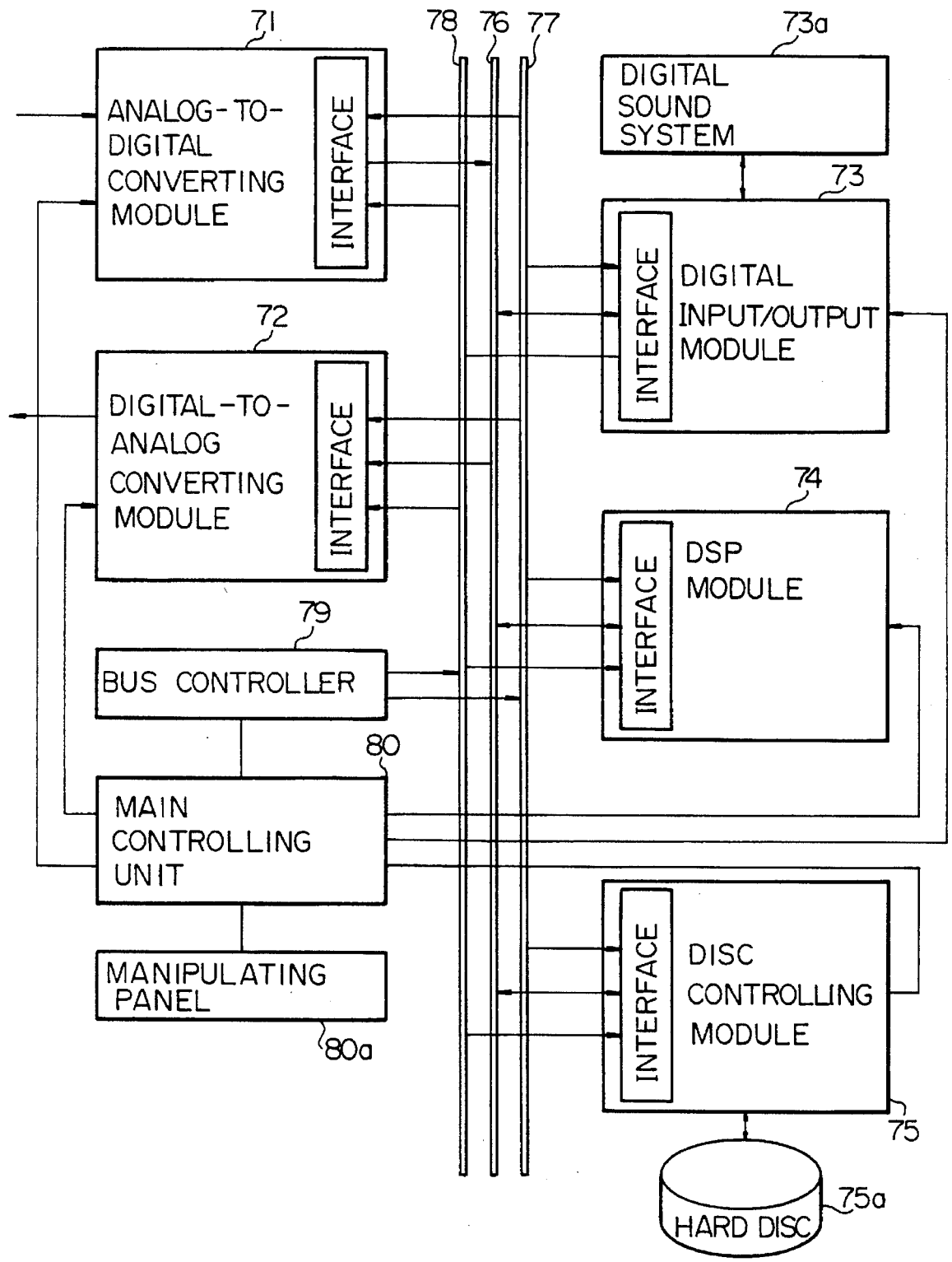
FIG. 7 is a block diagram showing a digital audio recording/reproducing system according to the present invention.

The present invention is further applicable to another system such as, for example, an audio recording/reproducing system shown in FIG. 7. The audio recording/reproducing system shown comprises an analog-to-digital converting module 71, a digital-to-analog converting module 72, a digital input-and-output module 73, a DSP module 74, and a disc controlling module 75 associated with a hard disc 75a. These modules 71 to 75 are communicable with one another through a data bus 76, and an address bus 77 and a control bus 78 are further provided thereto. The data bus 76 is under the control of a bus controller 79 coupled to a main controlling unit 80, and instructions are provided to the main controlling unit 80 through a manipulating panel 80a. The hard disc 75a is under the supervision of the disc controlling module 75, and digital data are written into and retrieved from the hard disc 75a. Since the audio recording/reproducing system shown in FIG. 7 is equipped with the digital input-output module 73, the system is extensible to another digital sound system 73a. Other component modules and units are similar to those incorporated in the sound synthesizing system shown in FIG. 4, and no further description is incorporated for the sake of simplicity.

The bus controller 79 behaves as similar to the bus controller 48, and a high speed data transmission and a synchronous data transmission are achieved by arranging the pieces of address information in an address queue formed therein.

Second Embodiment

Figure 8:
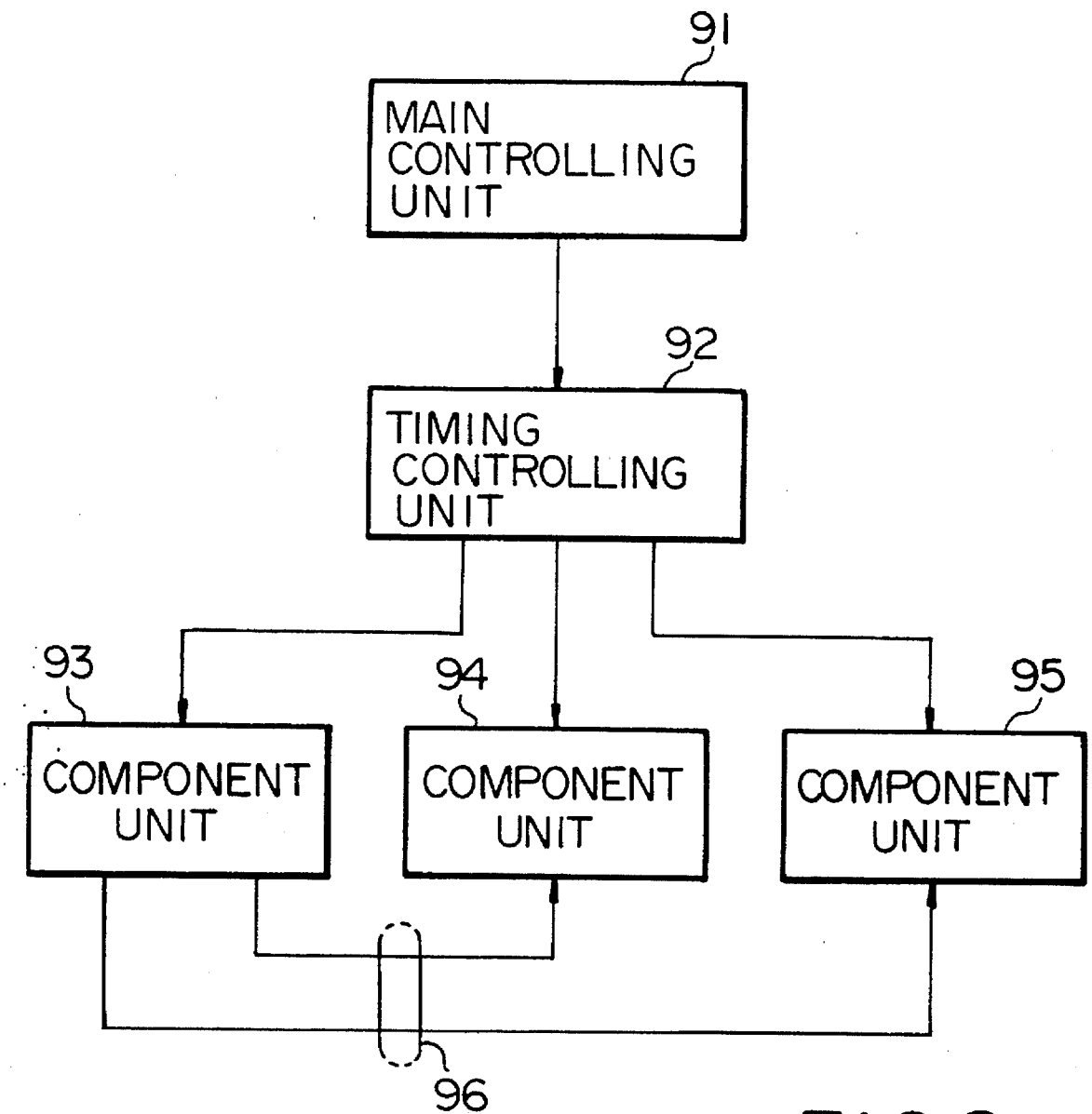
FIG. 8 is a block diagram showing the arrangement of another data transmission system according to the present invention.

Turning to FIG. 8 of the drawings, another data transmission system embodying the present invention largely comprises a main controlling unit 91 for sequentially producing pieces of address information, a timing controlling unit 92 supplied from the main controlling unit 91 with the pieces of address information and memorizing the pieces of address information in an address queue established therein, and a plurality of component units including component units 93, 94 and 95 sequentially supplied from the timing controlling unit 92 with the piece of address information at every predetermined timing and transmitting a data signal therebetween through a data bus 96.

In this instance, the component units selectively enter a single data transmission mode of operation and a broadcasting mode of operation. In detail, each of the pieces of address information has a first address indicative of a data source and a second address indicative of a destination. The destination is formed by one of the component units 93 to 95 in the single data transmission mode of operation but is constituted by a plurality of component units such as, for example, the component units 94 and 95 in the broadcasting mode of operation. Either single data transmission mode or broadcasting mode of operation is designated by each of the pieces of address information.

If the main controlling unit 91 cyclically produces a predetermined number of the pieces of address information and supplies to the timing controlling unit, data transmission is periodically carried out from one of the component units designated as the data source to another component unit designated as the destination in the single data transmission mode of operation. The predetermined number of the pieces of address information are hereinbelow referred to as "address cycle". If one of or a plurality of pieces of address information in each address cycle request one of the component units such as the unit 93 to enter the broadcasting mode of operation, a data signal is concurrently transmitted from the component unit 93 to a destination constituted by a plurality of component units such as the component units 94 and 95, and the broadcasting mode of operation enhances the data transmission rate of the data bus 96.

Figure 9:
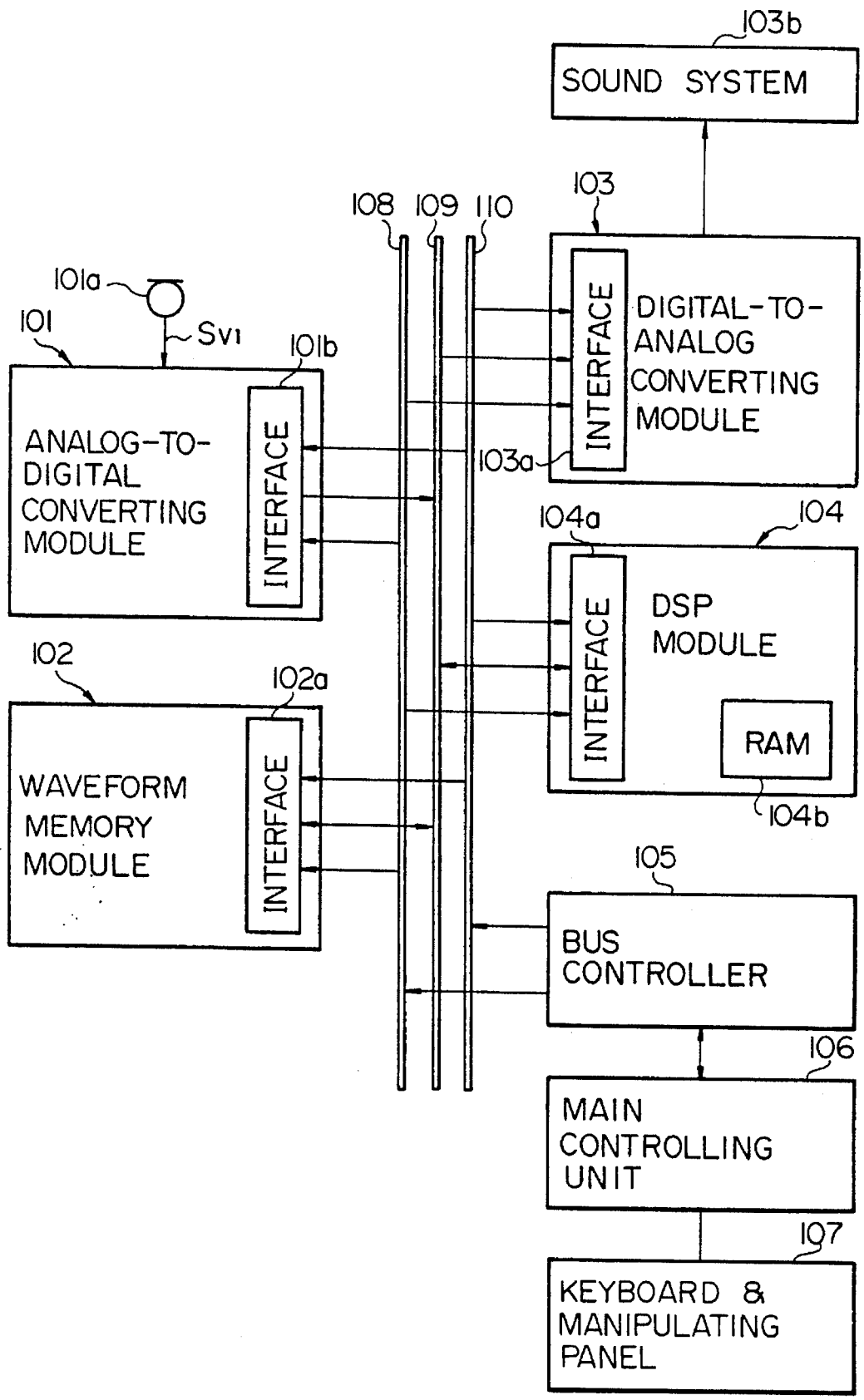
FIG. 9 is a block diagram showing the arrangement of a sound synthesizing system where the data transmission system shown in FIG. 8 is incorporated.

FIG. 9 illustrates a sound synthesizing system where the data transmission system shown in FIG. 8 is implemented. The sound synthesizing system shown in FIG. 9 comprises an analog-to-digital converting module 101 associated with a microphone 101a and having an interface 101b, a waveform memory module 102 with an interface 102a, a digital-to-analog converting module 103 with an interface 103a and coupled to a sound system 103b, and a DSP module 104 with an interface 104a and a random access memory 104b, and these modules 101 to 104 serving as the component units including the units 93 to 95. The sound synthesizing system further comprises a bus controller 105, a main controlling unit 106 and a combined unit 107 of a keyboard and a manipulating panel, and a control bus 108, a data bus 109 and an address bus 110 selectively interconnect the component modules and units 101 to 107; however, the modules 101 to 104 and the component units 105 to 107 achieve similar tasks to those of the first embodiment, and, for this reason, no further description is incorporated hereinbelow for avoiding repetition. Moreover, various control signal lines are also omitted from FIG. 9 for the sake of simplicity.

Figure 10:
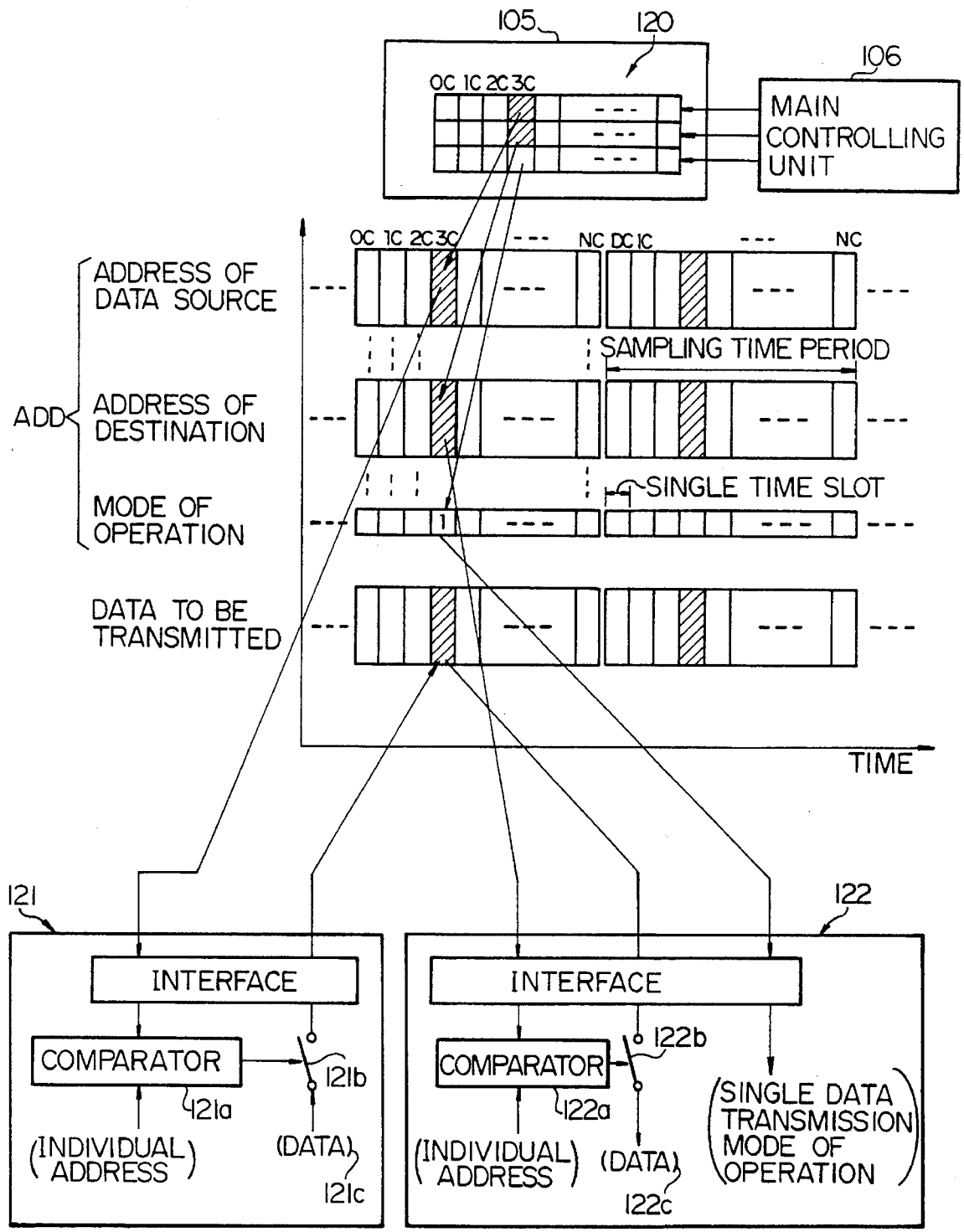
FIG. 10 is a view showing a single data transmission mode of operation achieved by the sound synthesizing system shown in FIG. 9.

The bus controller 105 is similar in arrangement to the bus controller shown in FIG. 5, and each of the modules 101 to 104 is slightly different from the modules 41 to 44 so as to cope with not only the single data transmission mode of operation but also the broadcasting mode of operation as described hereinbelow. Namely, each piece of address information supplied from the main controlling unit 106 to the bus controller 105 is carried on a multi-bit address signal ADD, and the multi-bit address signal ADD is formatted as shown in FIG. 10. Each column 0c, 1c, 2c, 3c, ... consisting of three blocks represents the multi-bit address signal ADD and enters an address queue 120. The uppermost block stands for a first address of a data source 121, the middle block indicates a second address of a destination 122, and the lowermost block is representative of a mode of operation, i.e. either single data transmission or broadcasting mode of operation. If the lowermost block is value "1", the single data transmission mode of operation is designated; however, the data source 121 and the destination 122 selected from the data component modules 101 to 104 enter the broadcasting mode of operation in the presence of the lowermost block of value "0". The analog-to-digital converting module 101, the waveform memory module 102 and the DSP module 104 are candidates of the data source 121, and the destination 122 is selected from the digital-to-analog converting module 103, the waveform memory module 102 and the DSP module 104. In the single data transmission mode of operation, the destination 122 consists of a single module selected from the modules 101 to 104, but a plurality of modules selected from the modules 101 to 104 constitute the destination 122 in the broadcasting mode of operation. All of the modules 101 to 104 are supplied with the address through the address bus 110, and a single data transmission is carried out from the module designated as the data source 121 to the module designated as the destination 122 through the data bus 109. Individual addresses have been assigned to the modules 101 to 104, and comparators 121a and 122a compare the individual addresses with the first and second addresses, respectively.

Description is firstly made on the single data transmission mode of operation with reference to FIG. 10 of the drawings. The address signals ADD are sequentially produced by the main controlling unit 106 and supplied to the bus controller 105. The address signals ADD successively enter the address queue 120 and sequentially read out from the queue 120 to the address bus 110 at every predetermined timings. The predetermined timings respectively define time slots, and a predetermined number (N+1) of the time slots constitute a single sampling time period. In this instance, the sampling time period is as long as a sampling cycle for an analog electric sound signal Sv1 supplied to the analog-to-digital converting module 101.

Assuming now that the multi-bit address signal represented by the column 3c is supplied from the bus controller 105 to all of the modules 101 to 104, the first address and the second address respectively activate the data source 121 and the destination 122 and switching elements 121b and 122b are closed. If the data source 121 stores pieces of sound information, a digital data signal indicative of the pieces of sound information is delivered from the data source 121, propagated by the data bus 109 and reaches the destination 122. Thus, various combinations of the data source 121 and the destination 122 are established by the address signals ADD and the single data transmission is repeated for every combination in each time slot. This enhances the data transmission rate. As described hereinbefore, since the sampling time period is adjusted to the sampling cycle for the analog electric sound signal Sv1, a real time data transmission is achieved from the analog-to-digital converting module 101 to a destination such as, for example, a digital-to-analog converting module 103 if one of the pieces of address information in every sampling time period designates the analog-to-digital converting module 101 as the data source 121. If, on the other hand, a high speed data transmission is requested, the same module is repeatedly designated by the pieces of address information during a single sampling time period.

Figure 11:
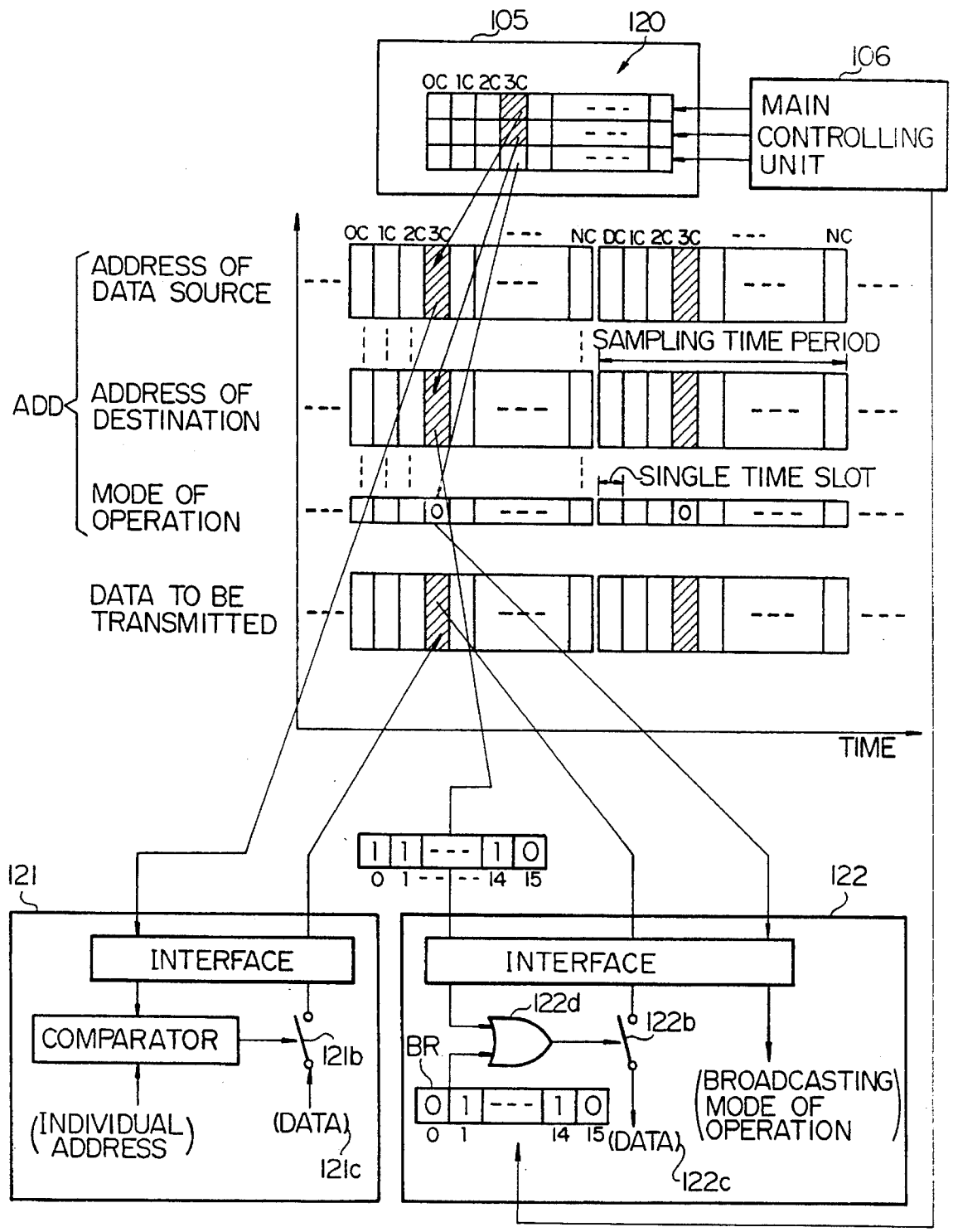
FIG. 11 is a view showing a broadcasting mode of operation achieved by the sound synthesizing system shown in FIG. 9.

The modules 101 to 104 enter the broadcasting mode of operation in the presence of the lowermost block of value "0" as shown in FIG. 11. The modules 101 to 104 have 16-bit broadcasting data registers BR, respectively, and the main controlling unit 106 provides a 16-bit group address to the respective broadcasting data register BR. The sixteen bits of the broadcasting register BR correspond to sixteen destination groups, respectively, and each bit indicates whether or not the module belongs to the corresponding designation group. If the bit is "0", the module belongs to the corresponding designation group; however, the bit "1" indicates that the module does not belong to the corresponding designation group. For example, the broadcasting register BR of the destination 122 memorizes a bit string (01 ... 10), and, therefore, the destination 122 belongs to the first and sixteenth designation groups only.

When a broadcasting data is written into the register BR of each module, the main controlling unit 106 successively produces the multi-bit address signal ADD which is supplied to the bus controller 105. Each of the address signal ADD is temporally stored in the address queue 120 and sequentially supplied to all of the modules 101 to 104 through the address bus 110. When the main controlling unit 106 requests the modules 101 to 104 to enter the broadcasting mode of operation, the lowermost block is set to value "0", and all of the modules 101 to 104 acknowledge the broadcasting mode of operation. In the broadcasting mode of operation, all of the modules 101 to 104 compare the first address indicative of the data source with the individual addresses, respectively, so as to see whether or not the bus controller 105 designates as the data source 121. However, the second address is compared with each of the broadcasting data stored in each register BR, and the switching element 122*b* is closed by an OR gate 122*d* upon matching the bit "0" of the second address with the corresponding bit of the group address.

Assuming now that the second address has a bit string of (11 . . . 10) designating the sixteenth group, the modules constituting the designation have respective broadcasting data with the fifteenth bit of "0", and the designation 122 is activated to participate the broadcasting data transmission. The module designated as the data source 121 put the digital data signal indicative of pieces of sound information on the data bus 109, and the data bus 109 propagates the digital data signal. When the digital data signal reaches the modules constituting the destination 122, the digital data signal is memorized in the destination 122. Thus, the pieces of sound information represented by the digital data signal are concurrently sent the designated modules such as, for example, the digital-to-analog converting module 103 and the DSP module 104.

If the broadcasting data transmission is established between the analog-to-digital converting module 101 (as the data source 121) and the digital-to-analog converting module; 103 as well as the DSP module 104, the analog electric sound signal Sv1 is retrieved in the digital-to-analog converting module 103 and transferred to the sound system 103*b* for reproduction of the sound. Since the digital data signal is further transmitted to the DSP module 104, the waveform of the sound is concurrently recorded. Thus, the reproduction and the recording are concurrently achieved in a single time slot under the broadcasting mode of operation. The data transmission system shown in FIG. 8 is further applicable to an audio recording/reproducing system shown in FIG. 12. The audio recording/reproducing system shown in FIG. 12 comprises an analog-to-digital converting module 131, a digital-to-analog converting module 132, a digital input/output module 133 associated with a digital sound system 134 outside of the audio recording/reproducing system, a DSP module 135, and a disc controlling module 136 for a hard disc 137, and these modules 131, 132, 133, 135 and 136 are communicable with one another through a data bus 138. The audio recording/reproducing system further comprises a bus controller 139 coupled to those modules 131, 132, 333, 135 and 136 through a control bus 140 and an address bus 141, and the bus controller 139 is under the control of a main controlling unit 142. A user provides instructions from a manipulating panel 143 to the main controlling unit 142. The analog-to-digital converting unit 131, the digital-to-analog converting unit 132 and the DSP module 135 participate recording, converting and reproducing operations on a sound as similar to the sound synthesizing system shown in FIG. 9.

Figure 12:
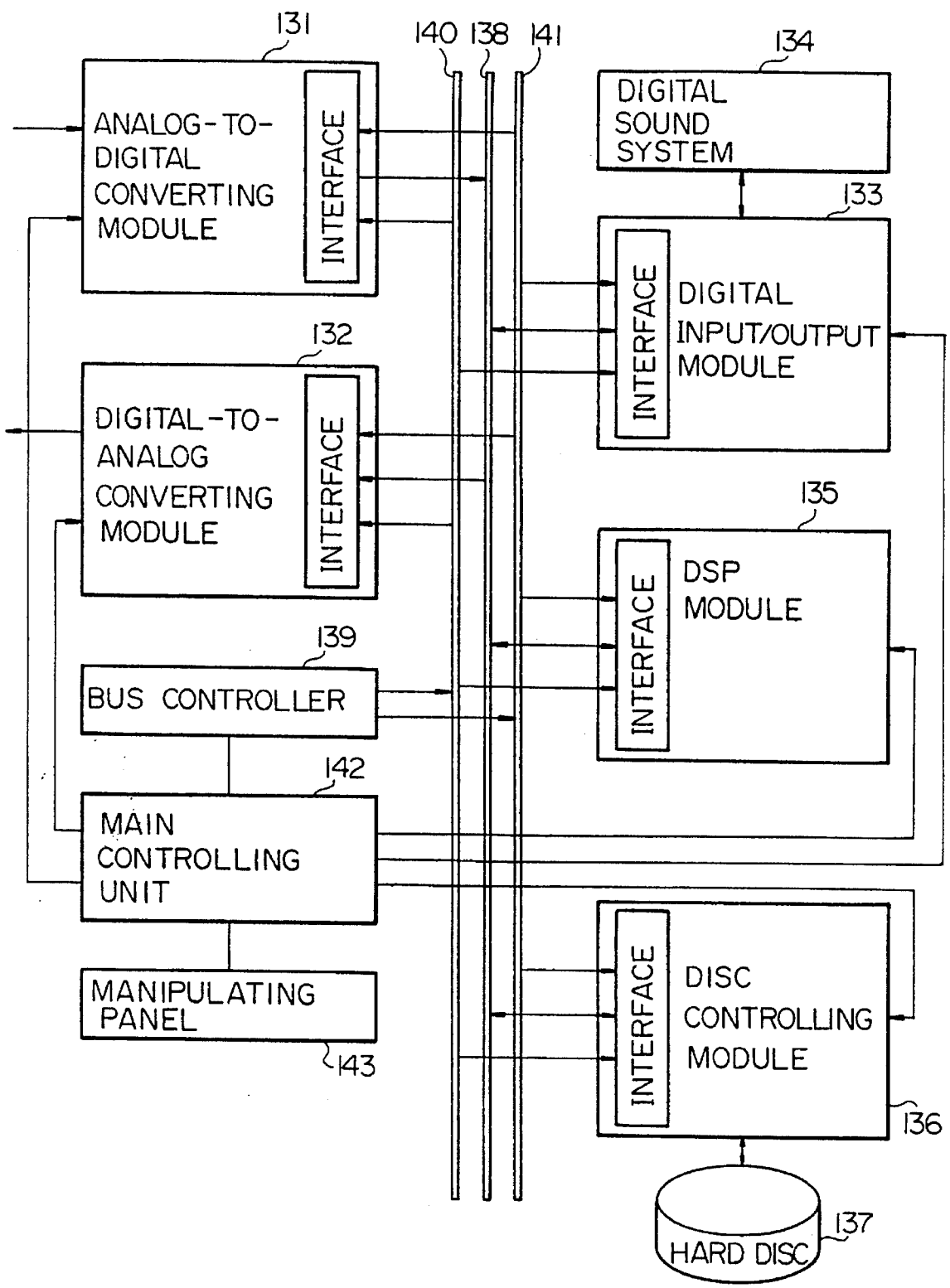
FIG. 12 is a diagram showing another digital audio recording/reproducing system according to the present invention.

The audio recording/reproducing system shown in FIG. 12 also enters the single data transmission mode and the broadcasting mode of operation and achieves a complex task in the broadcasting mode of operation. For example, a digital sound signal supplied from the digital sound system is transferred through the digital input/output module 133 to the data bus 138 and the digital-to-analog converting module 132 retrieves an analog sound signal for reproducing sounds. Moreover, since the digital sound signal is further provided to the disc controlling module 75 in the broadcasting mode of operation, the digital sound signal is concurrently recorded in the hard disc 137 in the same time slot.

Third Embodiment

Figure 13:
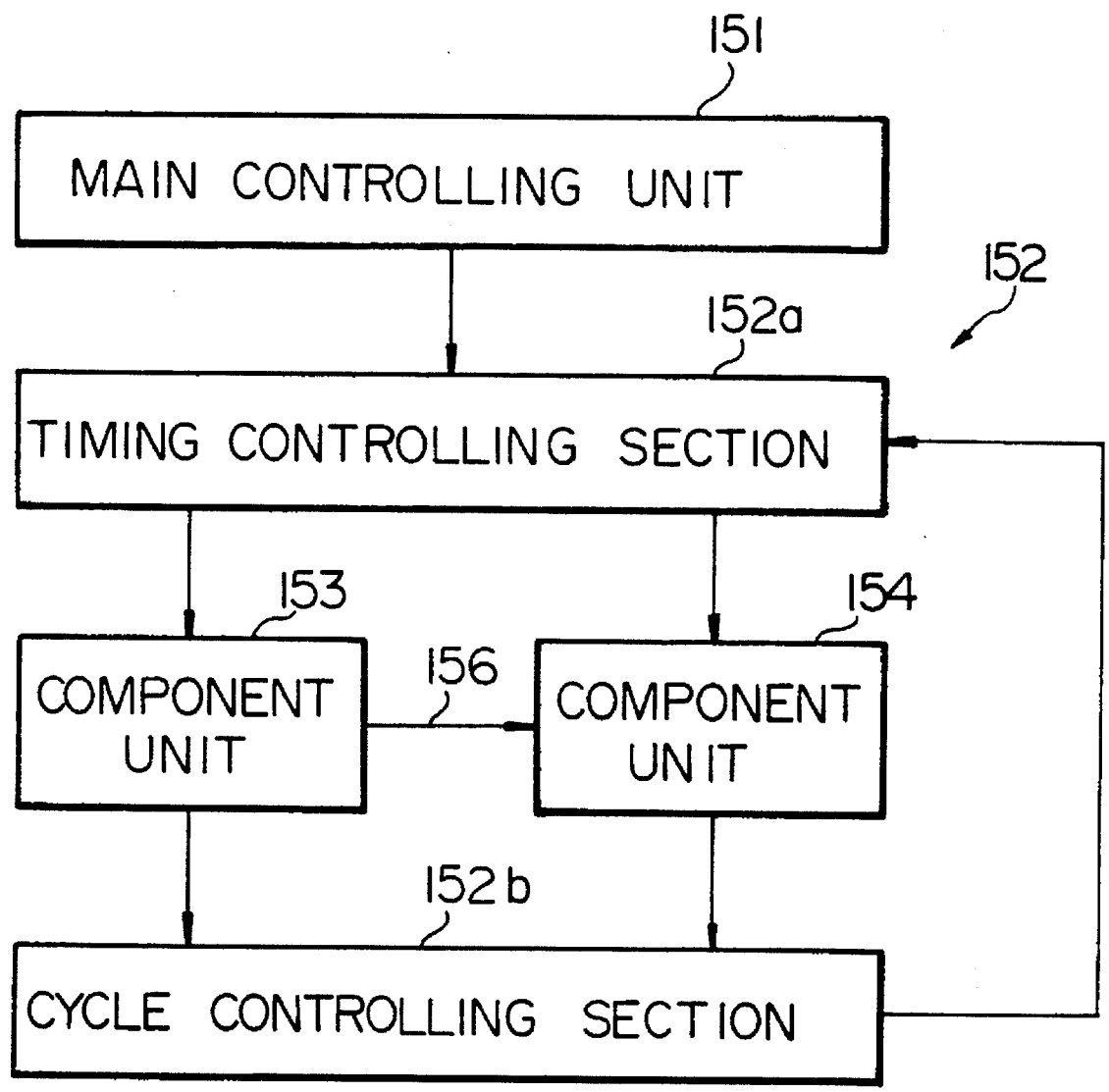
FIG. 13 is a block diagram showing the arrangement of still another data transmission system according to the present invention.

Turning to FIG. 13 of the drawings, another data transmission system embodying the present invention comprises a main controlling unit 151 for sequentially producing pieces of address information, a timing controlling unit 152 having a timing control section 152*a* supplied from the main controlling unit 151 with the pieces of address information and memorizing the pieces of address information in an address queue established therein, and a plurality of component units including component units 153 and 154 sequentially supplied from the timing controlling section 152*a* with the piece of address information at every timing and transmitting a data signal therebetween. The timing control unit 152 further has a cycle controlling section 152*b* which controls the timing controlling section 152*a* not to send the next piece of address information while the component unit 153 or 154 is operating.

In operation, the main controlling unit 151 successively produces the pieces of address information and supplies the pieces of address information to the timing controlling unit 152. The pieces of address information enter an address queue formed in the timing controlling section 152*a* and sequentially read out at respective predetermined timings. Each of the pieces of address information is supplied to all of the component units, and each component unit compares the pieces of address information with an individual address assigned thereto. Each piece of address information is indicative of a first address of a data source and a second address of a destination, and at least two of the component units acknowledge themselves to be designated as the data source and the destination, respectively. If the component units 153 and 154 are respectively designated as the data source and the destination, the data bus 156 is occupied by the component units 153 and 154, and a data signal is transmitted from the component unit 153 to the component unit 154 through the data bus 156 at a time slot defined by the timing controlling section 152*a*. If the next piece of data information designates other component units as the data source and the destination, a data transmission is carried out therebetween at the next time slot. Thus, the data transmission can be repeated between the data source and the destination in every time slot. If a large amount of data information is transmitted from one of the component units to another component unit, a series of the pieces of address information repeatedly designate these component units as the data source and the destination. If the data source or the destination takes too much time to operate, the cycle controlling section 152*b* prohibits the timing controlling section 152*a* from changing the designation of the data source and the destination, and, for this reason, the data transmission cycle can be prolonged over the sampling time period.

Figure 14:
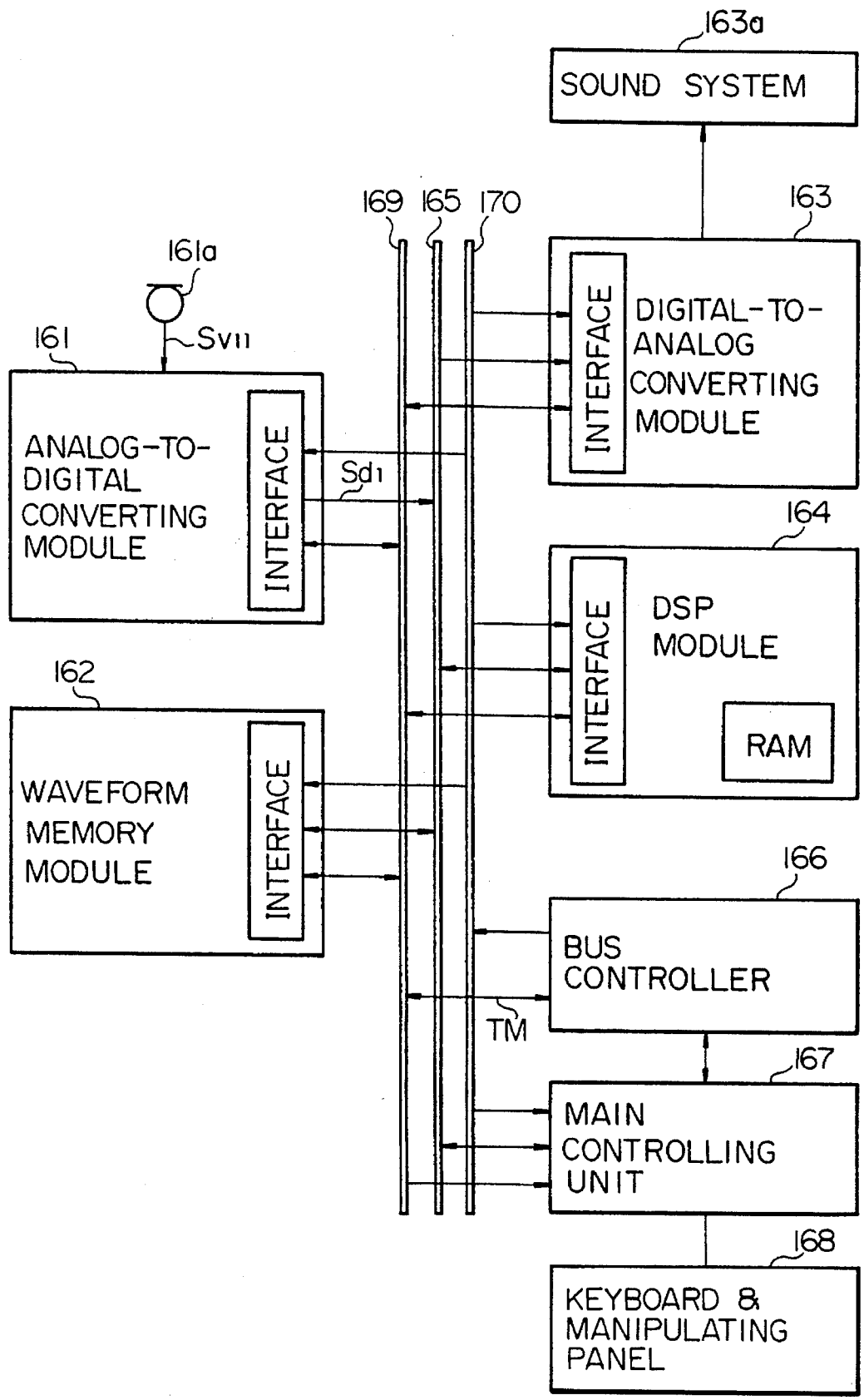
FIG. 14 is a block diagram showing the arrangement of still another sound synthesizing system in which the data transmission system shown in FIG. 13 is incorporated.

The data transmission system shown in FIG. 13 is applicable to a sound synthesizing system illustrated in FIG. 14.. The sound synthesizing system shown in FIG. 14 comprises an analog-to-digital converting module 161 associated with a microphone 161*a* for converting an analog electric sound signal Sv11 into a series of digital sound signal Sd1, a waveform memory module 162 for storing various waveforms of sounds in the digital form, a digital-to-analog converting module 163 operative to retrieve the analog sound signal and coupled to a sound system 163*a*, and a DSP module 164 operative to modify a waveform, and these modules 161 to 164 selectively serving as the component units 153 to 154. A data bus 165 interconnects the modules 161 to 164, and a data transmission is carried out between the modules designated as a data source and a destination.

The sound synthesizing system further comprises a bus controller 166, a main controlling unit 167 and a combined unit 168 of a keyboard and a manipulating panel, and the bus controller 166 are coupled to the modules 161 to 164 through a control bus 169 and an address bus 170. Since the modules 161 to 164 are assigned individual addresses, respectively, the bus controller 166 designates two modules as a data source and a designation for data transmission. A user produces pieces of musical information indicative of tones assigned to depressed keys, an effect requested to be imparted to sounds and so forth, and the pieces of musical information are fed to the main controlling unit 167. Though not shown in the drawings, a central processing unit and memory units are incorporated in the main controlling unit and assigns tasks to the modules 161 to 164, respectively. The main controlling unit 167 further produces pieces of address information, and each piece of address information indicative of a first address of the data source and a second address of the destination. The pieces of address information are sequentially supplied to the bus controller 166 and form an address queue in the bus controller 166. The bus controller 166 distributes the pieces of address information through the address bus 170 to the modules 161 to 164 in synchronization with a timing signal TM, and a data transmission is carried out between the data source and the destination. Each timing signal TM defines a time slot for a single data transmission, and each of the modules 161 to 164 can report an operational status to the bus controller 166 through the control bus 169. An individual address is assigned to the main controlling unit 167, and the main controlling unit 167 is capable of direct communication with the modules 161 to 164 through the data bus 165. Then, the main controlling unit 167 can achieve complex tasks on waveform modification through the direct communication with the modules 161 to 164. Various discrete control signal lines are further provided in the sound synthesizing system, however, they are omitted from FIG. 14 for the sake of simplicity.

Figure 15:
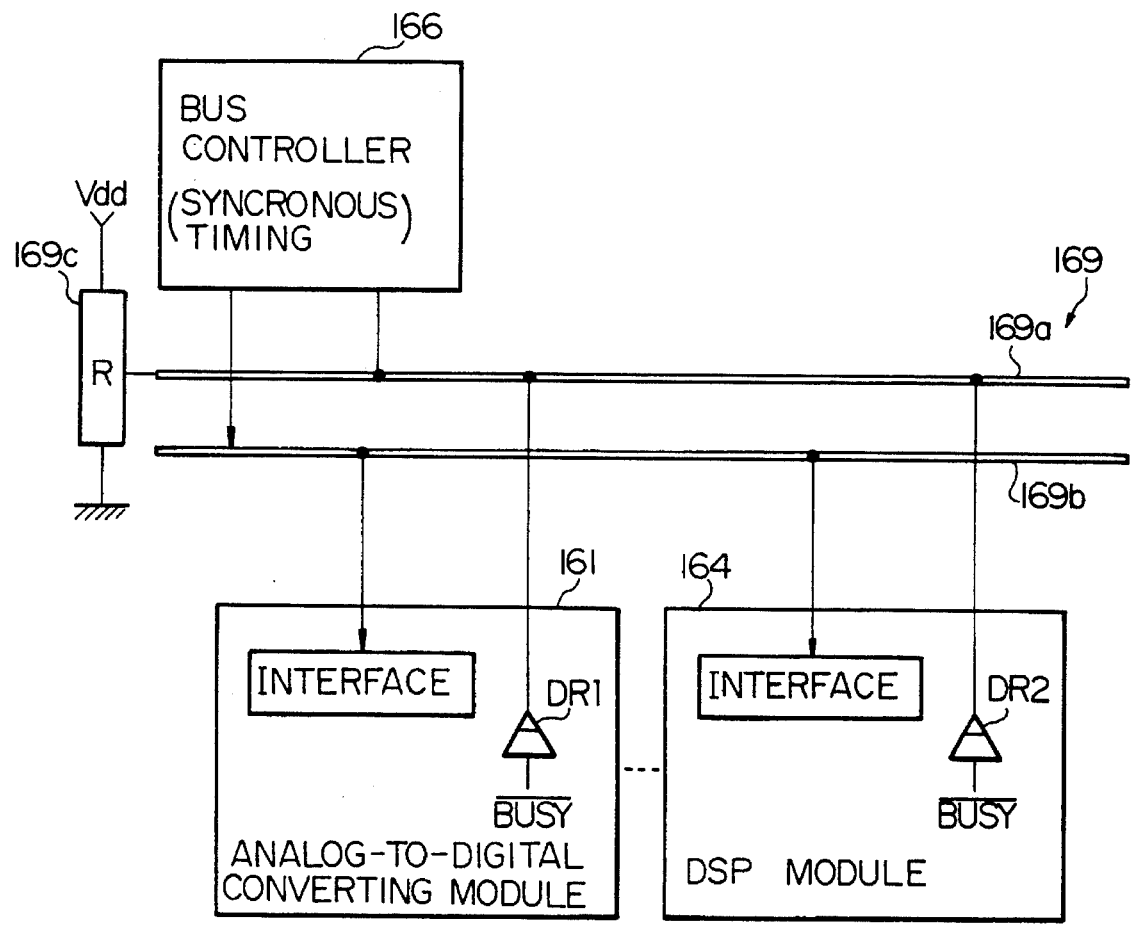
FIG. 15 is a view showing a communication between a bus controller and two of the component modules incorporated in the sound synthesizing system shown in 14.

FIG. 15 shows a bus control using the control bus 169, and the control bus 169 has an MSYNC section 169a. The bus controller 166 produces several synchronous timing signals, and the other section 169b propagates the synchronous timing signals to the modules 161 to 164 as will be described hereinlater in detail.

The modules 161 to 164 respectively have driver circuits DR1, DR2, . . . each implemented by an open-collector circuit, and the driver circuits DR1, DR2, . . . supplies $\overline{BUSY}$ signals of an active low level to the MSYNC section 169a. A terminator 169c is coupled between one end of the MSYNC section 169a and a source of positive high voltage level Vdd so as to keep the MSYNC section 169a high in the absence of the $\overline{BUSY}$ signal of the active low voltage level. When one of the modules 161 to 164 is activated for a data transmission, the $\overline{BUSY}$ signal of the active low voltage level takes place and allows the MSYNC section 169a to go down to the low voltage level. This means that the operational status is reported to the bus controller 166 through the MSYNC section 169a. The terminator 169c, the MSYNC section 169a and the driver circuits DR1, DR2, . . . as a whole constitute a circuit to be said as "wired-AND gate".

The modules 161 to 164 are similar in behavior to those of the first embodiment, and no description is incorporated hereinbelow for avoiding repetition.

Figure 16:
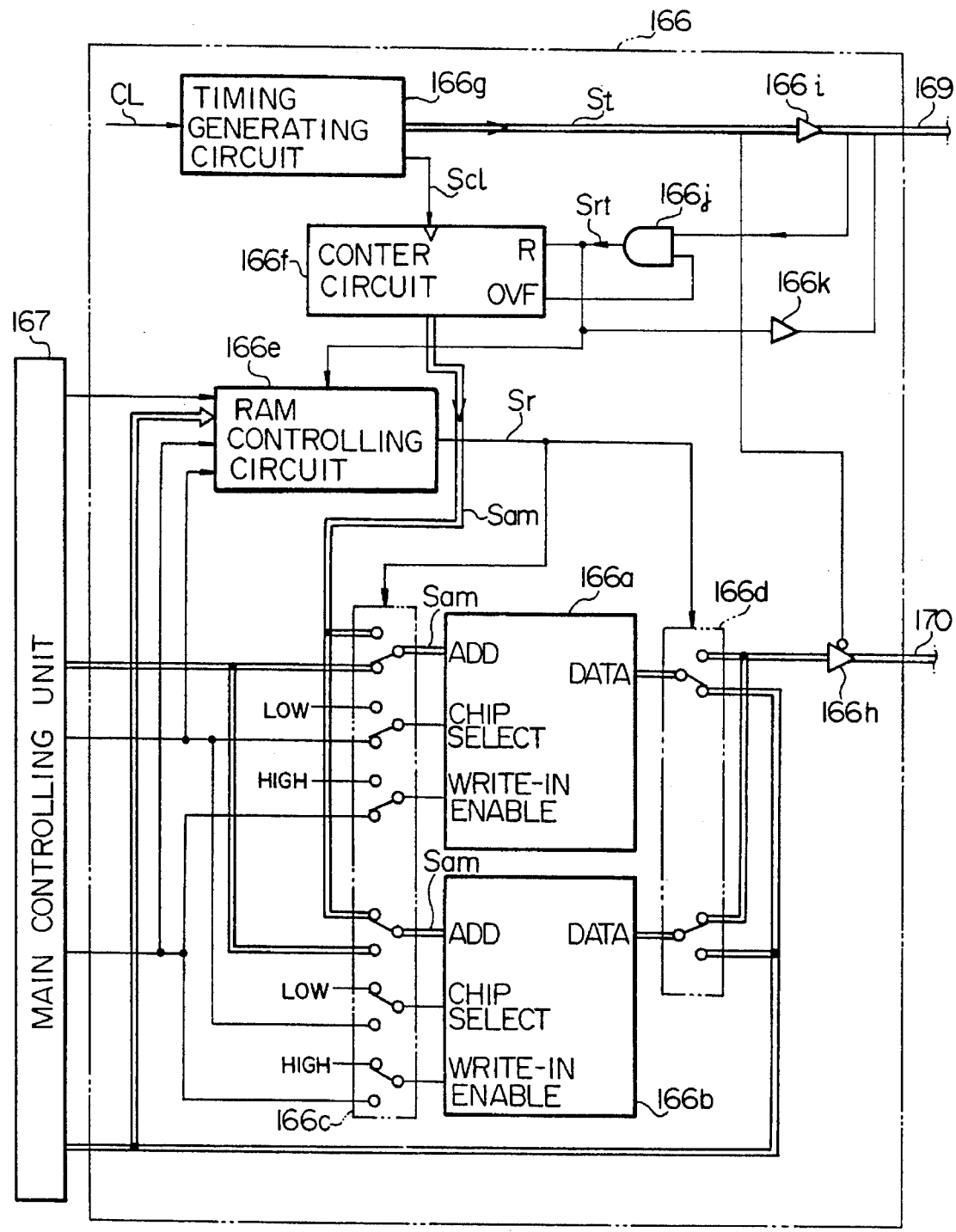
FIG. 16 is a block diagram showing the arrangement of a bus controller incorporated in the sound synthesizing system shown in FIG. 14.

Turning to FIG. 16 of the drawings, the arrangement of the bus controller 166 is illustrated in detail. The bus controller 166 comprises a first random access memory unit 166a and a second random access memory unit 166b, and each of the random access memory units 166a and 166b has an address port (abbreviated as "ADD") supplied with an address signal Sam indicative of a memory address of the random access memory unit 166a or 166b, a data port (designated by "DATA"), a chip select terminal and a write-in control terminal. The random access memory unit 166a or 166b is activated in the presence of a chip select signal of an active low level supplied to the chip select terminal. If a write-in control signal of an inactive high level is supplied to the write-in control terminal, data bits are read out from memory cells indicated by an address signal Sam fed to the address port of the activated memory unit 166a or 166b to the data port thereof; however, data bits supplied to the data port are written into memory cells indicated by the address signal Sam in the presence of the write-in control signal of the active low level. If the chip select signal remains in the inactive high level, the data port enters a high-impedance state, and, therefore, no communication is established between the memory cells and the outside thereof.

The bus controller 166 further comprises first and second switching units 166c and 166d each having a plurality of switching elements, and the first and second switching units 166c and 166d are responsive to a controlling signal Sr fed from a RAM controlling circuit 166e. Namely, if the first and second switching units 166c and 166d are changed to the state shown in FIG. 16, the first switching unit 166c allows the main controlling unit 167 to rewrite data bits stored in the first random access memory unit 166a. However, since the second random access memory unit 166b is supplied at the chip select terminal with the active low level and at the write-in control terminal with the inactive high voltage level, the second random access memory unit 166b becomes responsive to the address signal Sam fed from a counter circuit 166f and the address signal Sam is indicative of an address sequentially incremented by clock signal Sc1 fed from a timing generating circuit 166g. Then, the second random access memory unit 166b provides data bits to the output port thereof. The second switching unit 166d relays the data bits thus read out to a tri-state buffer circuit 166h which in turn transfers the data bits to the address bus 170 as the address signal indicative of the first and second addresses.

If, on the other hand, the first and second switching units 166c and 166d are changed from the states shown in FIG. 16 to the opposite states or all of the switching elements provide signal paths to the other contacts, the second random access memory unit 166b is communicable with the main controlling unit 167, and the first random access memory unit 166a supplies data bits to the address bus 170 in synchronization with the address signal Sam fed from the counter circuit 166f.

As described hereinbefore, the timing generating circuit 166g supplies the clock signal Sc1 to the counter circuit 166f for incrementing the memory address indicated by the address signal Sam. The timing generating circuit 166g is further operative to define a series of time slots. Namely, a system clock signal CL is supplied to the timing generating circuit 166g, and the timing generating circuit 166g produces a time slot controlling signal St (which is equivalent to the timing signal TM in FIG. 14) on the basis of the system clock signal CL. The time slot controlling signal St is fed through a buffer circuit 166i to the control bus 169, and each time slot starts with the time slot controlling signal St. Each time slot is defined as "a unit of time interval for a single data transmission" in the sound synthesizing system shown in FIG. 14. Each module 161 to 164 is responsive to the time slot controlling signal St and two of the modules 161 to 164 designated as the data source and the destination occupies the data bus 169 over the single time slot for the data transmission. The time slot controlling signal St is further supplied to the tri-state buffer circuit 166h for synchronous operation. Detailed description will be made hereinlater.

Since the clock signal Sc1 is delivered at every time slot, the counter circuit 166f is incremented in synchronization with the time slot controlling signal St. The counter circuit 166f starts at value "0" and increases the value to "N". When the value reaches "N", the counter circuit 166f returns to value "0" and repeats the counting operation between values "0" and "N". The value from "0" to "N" is indicative of the memory address assigned to a group of the memory cells incorporated in either random access memory unit 166a or 166b, and, therefore, the address signal Sam circulates between the memory address "0" and the memory address "N". The memory addresses "0" to "N" designates (N+1) pairs of the data source and the destination and controls (N+1) data transmissions. Since the (N+1) data transmissions need (N+1) time slots, a sampling time period consists of (N+1) time slots. In this instance, the sampling time period is equivalent to a sampling interval of an analog electric sound signal supplied to the analog-to-digital converting module 161.

When the counter circuit 166f reaches value "N", the next clock signal Sc1 causes an overflow state to take place in the counter circuit 166f, and the overflow terminal OVF thereof is shifted to logic "1" level. In the overflow state, the counter circuit 166f interrupts the counting operation until a reset signal of logic "1" level is applied to the reset terminal R thereof. The overflow terminal OVF is coupled to an AND gate 166j, and another input terminal of the AND gate 166j is coupled to the MSYNC section 169a of the control bus 169. As described hereinbefore, the MSYNC section 169a remains in the high voltage level or logic "1" level as long as no module enters the operational status, and, for this reason, the AND gate 166j supplies logic "1" level to the reset terminal R if (N+1) data transmissions are completed upon occurrence of the overflow state. Then, the counter circuit 166f is released from the overflow state, and the counting value returns to "0". However, if an operation of a component unit is not completed in the (N+1)th time slot, the $\overline{\text{BUSY}}$ signal of the active low voltage level causes the MSYNC section 169a to be still in the low voltage level or logic "0" level, and, for this reason, the AND gate 166j never resets the counter circuit 166f. Since the output signal Srt of the AND gate 166j is further supplied to the RAM controlling circuit 166e and causes the RAM controlling circuit 166e to change the states of the first and second switching units 166c and 166d, the timing for change is delayed until the operation of the component unit is completed. When the MSYNC section 169a is recovered to the high voltage level, the AND gate 166j produces the output signal Srt, and allows the counter circuit 166f to restart. In the presence of the output signal Srt, the RAM controlling circuit 166e produces the control signal Sr and allows the first and second switching units 166c and 166d to change the signal paths. The output signal Srt is further supplied to the control bus 169 through a buffer circuit 166k. The time interval between the counting value "0" and the occurrence of the output signal. Srt is hereinbelow referred to as "cycle". If the MSYNC section 169a remains in the high voltage level or logic "1" level, the cycle is equivalent to the sampling time period.

In this instance, the timing generating circuit 166g, the counter circuit 166f and the RAM controlling circuit 166e as a whole constitute address information generating means, and the AND gate 166j serves as a logic gate.

Figure 17:
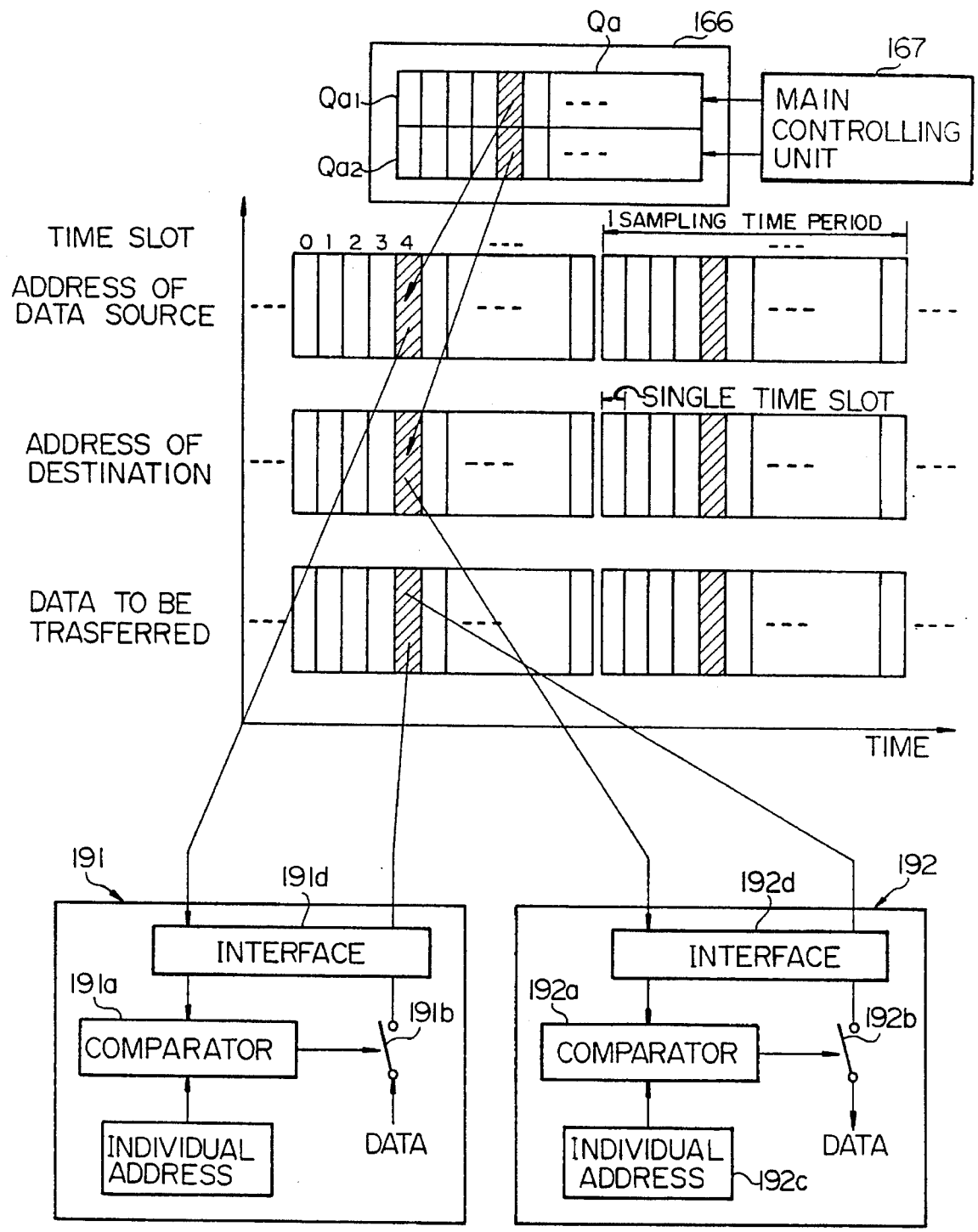
FIG. 17 is a view showing a data transmission mode of operation achieved by the sound synthesizing system shown in FIG. 14 within a single sampling time period.

The circuit behavior of the bus controlling circuit is similar to that of the bus controlling circuit 48 as long as the MSYNC section 169a is in the high voltage level or logic "1" level. For this reason, the data transmission completed within a single sampling time period is briefly described with reference to FIG. 17 only, and description is focused upon the data transmission cycle over a single sampling time period.

Assuming now that the pieces of address information enter an address queue Qa produced in either random access memory unit 166a or 166b of the bus controller 166, every block in the upper row Qa1 is paired with the corresponding block in the lower row Qa2, and each block pair indicates the piece of address information. Each piece of address information contains a first address of a data source 191 (represented by the block in the upper row Qa1) and a second address of a destination 192 (represented by the block in the lower row Qa2), and these addresses are represented by data bits or a data bit group memorized in either first or second random access memory unit 166a or 166b. In the following description, one of the analog-to-digital converting module 161, the waveform memory module 162 and the DSP module 164 is designated as the data source, and one of the digital-to-analog converting module 163, the waveform memory module 162 and the DSP module 164 serves as the destination.

When the sequential read-out operation reaches the hatched blocks in the address queue Qa, the piece of address information or the data bit group is read out to the address bus 170 and the addresses are respectively transferred to the modules 161 and 164 in the time slot "4". The address of the data source is distributed to all of the modules 161 to 164, and the modules 161 to 164 compares the address of the data source with the individual addresses assigned thereto. Only the module serving as the data source 191 finds that the first address to be distributed is matched with the individual address assigned thereto through the comparison carried out by a component comparator 191a, and the component comparator 191a closes a component switching element 191b. Then, a data signal indicative of sound data to be requested is put on the data bus 165.

The address of the destination 192 is also distributed to all of the modules 161 to 164 within the same time slot "4" and is compared with the individual addresses assigned the respective modules 161 to 164. In another module serving as the destination 192, a component comparator 192a allows a component switching element 192b to be close upon matching the second address of the destination 192 with the individual address. The data signal indicative of the sound data passes through an interface 192d, and the sound data is processed through the function of the module. Thus, the bus controller 166 sequentially designates two of the modules 161 to 164 as the data source 191 and the destination 192 in every time slot and, accordingly, allows various data to be transmitted through the single data bus 165. If the MSYNC section 169a is recovered to the high voltage level at a termination of a sampling time period, the counter circuit is immediately reset to value "0" upon an occurrence of the overflow, and the data transmissions and the operation of the module are completed with a single sampling time period equivalent to a single cycle as shown in FIG. 18A.

If a plurality of time slots are assigned to two of the modules 161 to 164, a large amount of the sound data is transmitted from the data source 191 to the destination 192.

However, if a module consumes a time period longer than a single sampling period, the cycle is prolonged until a completion of the operation thereof. Namely, a complex data processing consumes a large amount of time period, the data transmission from the main controlling unit 167 to the DSP module 164 is carried out in an extension as shown in FIG. 18B.

Assuming now that a series of the time slots selected from "0" to "N" of a single sampling time period are assigned to the data transmission from the main controlling unit 167 to the DSP module 164, the upper blocks repeatedly designate the main controlling unit 167, and each of the lower blocks stands for the second address indicative of the DSP module 164. When the memory address "0" is supplied to either random access memory unit 166a or 166b, the data bits indicative of the first and second addresses are read out from the random access memory unit 166a or 166b to the address bus 170 in synchronization with the time slot controlling signal St. The main controlling unit 167 acknowledges itself designated as the data source 191, and the DSP module 164 is ready for receipt of the data to be transmitted from the main controlling unit 167. A part of the data is transmitted from the main controlling module 167 to the DSP module 164 in the first time slot "0", and the memory address is incremented to "1" for the second data transmission. Thus, the data are transmitted from the main controlling unit 167 to the DSP module 164 while the time slot proceeds from "0" to "N". The MSYNC section 169a of logic "0" level prohibits the AND gate 166j from producing the output signal Srt, and, for this reason, the counter circuit 166f remain in the overflow state. This results in that the address signal ADD retains the memory address "N" and that no alternation between the random access memory units 166a and 166b takes place. Then, the main controlling unit 167 continues to occupy the data bus 165 and the data transmission is continued over the sampling time period.

Figure 19:
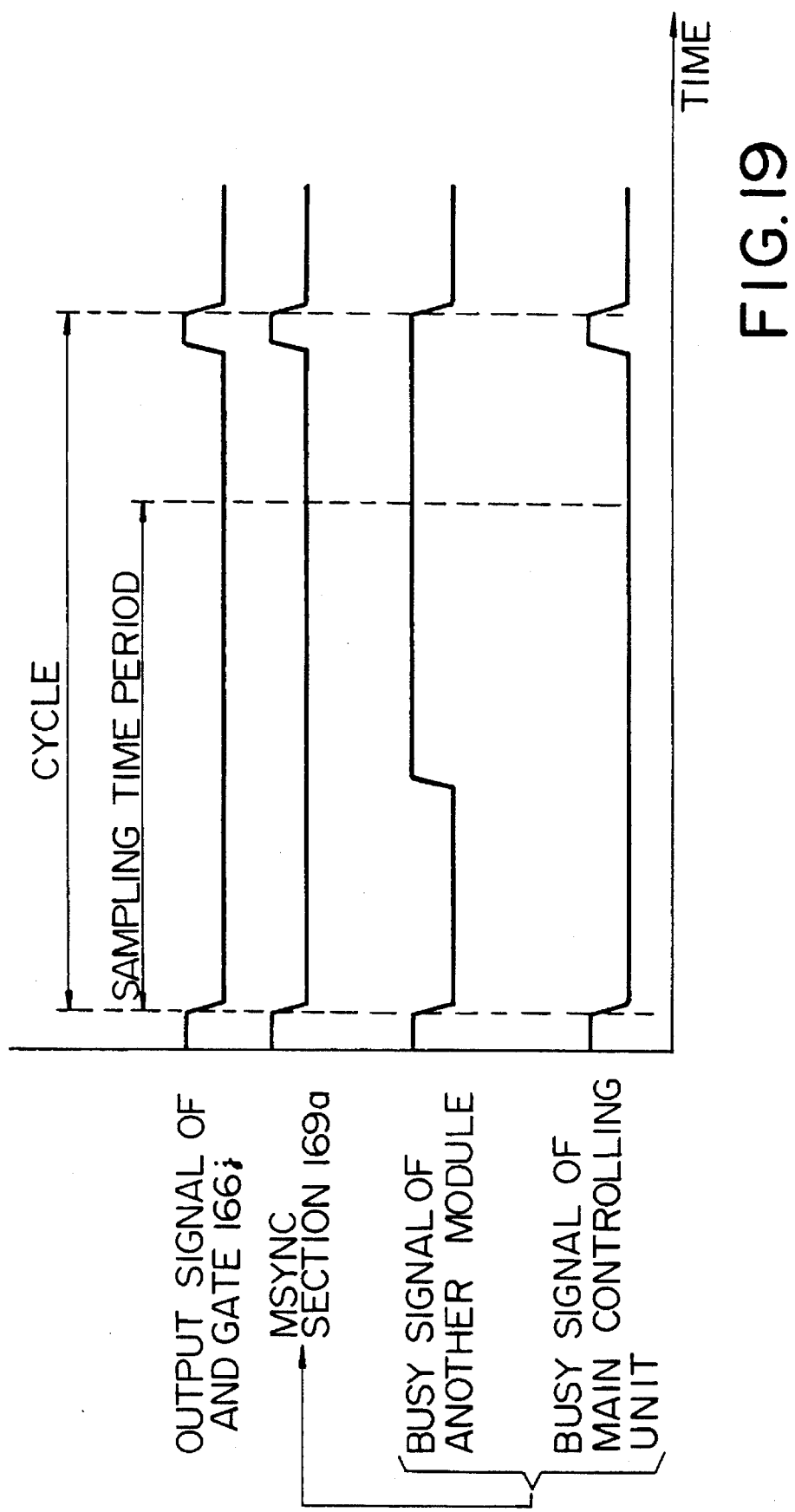
FIG. 19 is a diagram showing an interrupt operation on a counter circuit incorporated in the bus controller shown in FIG. 16.

If all of the data are transmitted from the main controlling unit 167 to the DSP module 164, the buffer circuit of the main controlling unit 167 allows the MSYNC section 169a to recover to the high voltage level or logic "1" level. With logic "1" level on the MSYNC section 169a, the AND gate 166j produces the output signal Srt which is fed to the counter circuit 166f for reset as well as the RAM controlling circuit 166e for alternation between the random access memory units 166a and 166b. This results in that a new sampling time period starts with the first time slot "0". FIG. 19 illustrates an automatic extension of sampling time period.

Thus, the bus controller 166 shown in FIG. 16 achieves the data transmission for a real time processing and the automatic extension of sampling time period.

Figure 20:
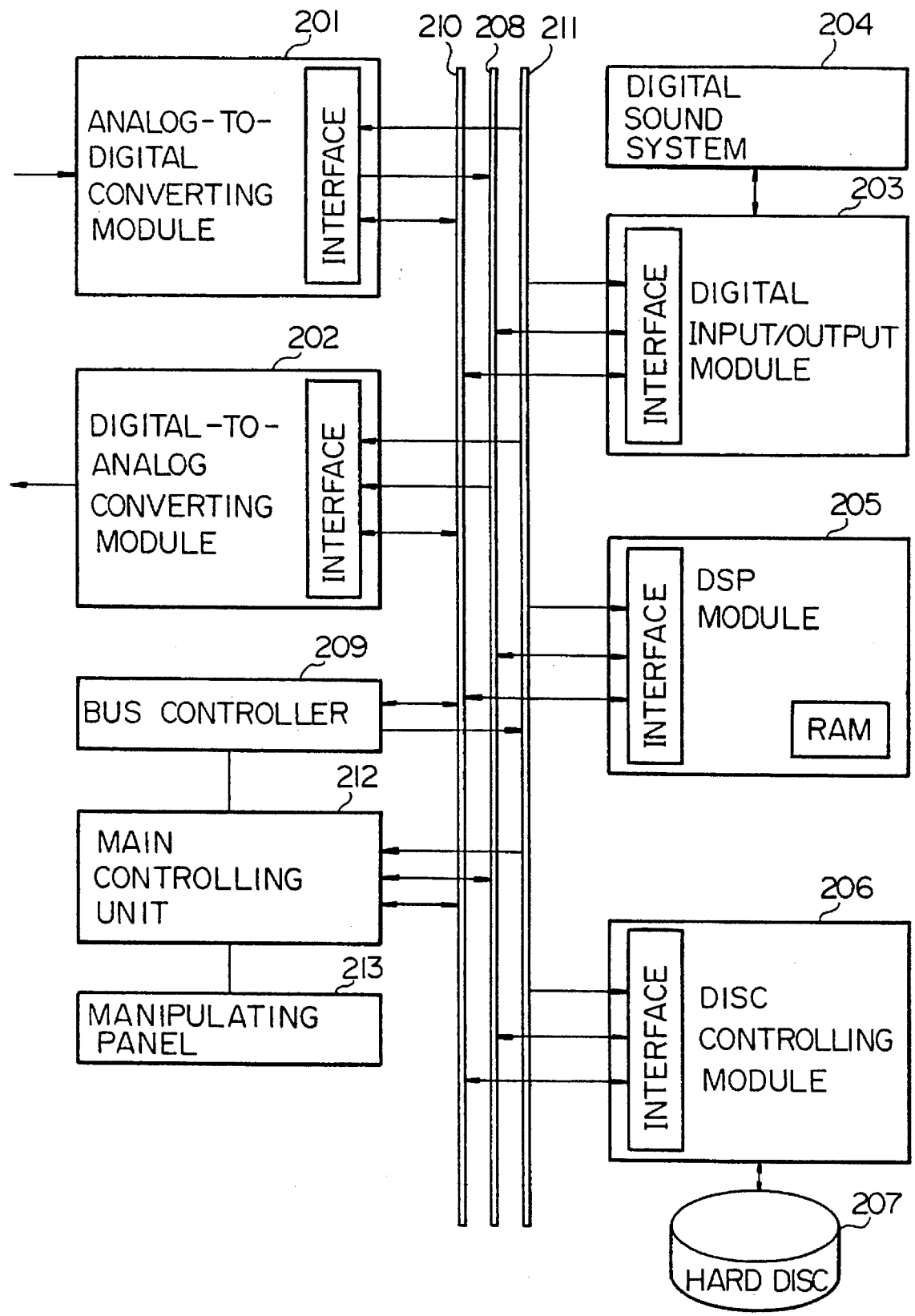
FIG. 20 is a block diagram showing the arrangement of still another data transmission system according to the present invention.

The data transmission system shown in FIG. 13 is further applicable to an audio recording/reproducing system shown in FIG. 20. The audio recording/reproducing system shown in FIG. 20 comprises an analog-to-digital converting module 201, a digital-to-analog converting module 202, a digital input/output module 203 associated with a digital sound system 204 outside of the audio recording/reproducing system, a DSP module 205, and a disc controlling module 206 for a hard disc 207, and these modules 201, 202, 203, 205 and 206 are communicable with one another through a data bus 208. The audio recording/reproducing system further comprises a bus controller 209 coupled to those modules 201, 202, 203, 205 and 206 through a control bus 210 and an address bus 211, and the bus controller 209 is under the control of a main controlling unit 212. A user provides instructions from a manipulating panel 213 to the main controlling unit 212. The analog-to-digital converting unit 201, the digital-to-analog converting unit 202 and the DSP module 205 participate recording, converting and reproducing operations on a sound as similar to the sound synthesizing system shown in FIG. 14.

In the audio recording/reproducing system shown in FIG. 20, the data transmission for a real time processing is desirable for the digital sound system 204. A series of digital sound signals are transmitted from the digital sound system 204 to the digital input/output module 203, converted by interface and transmitted through the data bus 208 to the digital-to-analog converting module 202, and the digital-to-analog converting unit 202 retrieves an original analog waveform for reproducing the original sounds. While, sound data memorized in the DSP module 205 are transferred to the main controlling unit 212 for waveform modification and, thereafter, transmitted to the DISC controlling module 206 for disc recording. In this case, the main controlling unit 212 takes long time in the operation, and the operation does not finish within a single sampling period. Then, the bus controller extends the cycle and allows the processed data to reach the disc controlling module 206 within a single cycle.

As will be understood from the foregoing description, the data transmission system according to the present invention effectively controls the data bus and enhances the data transmission rate without any sacrifice of simple data bus arrangement.

Although particular embodiments of the present invention have been shown and described, it will be obvious to those skilled in the art that various changes and modifications may be made without departing from the spirit and scope of the present invention. For example, the sound synthesizing system shown in FIG. 11 is characterized by the broadcasting data having the bits respectively corresponding to address groups; however, the binary values represented by the broadcasting data may correspond to address groups, respectively. In this implementation, the address groups are increased to an arbitrary number less than $2^{16}$.

The second address may be shared between the single data transmission mode of operation and the broadcasting mode of operation. If individual M modules are assigned addresses "0" to "M", respectively, the second address from "M+1" to "65535" can designate address groups without any lowermost block. In the second embodiment, the destination is constituted by the two component units in the broadcasting mode of operation. However, the destination may be constituted by more than two component units.

What is claimed is:

1. A data transmission system comprising:
   a) main controlling means for providing pieces of address information, each piece of address information including a first address for a data source and a second address for a data destination, said main controlling means further providing mode information indicative of information included in said second address,
   b) bus means having an address bus and a data bus,
   c) a plurality of component units assigned individual addresses, and broadcasting data, respectively, and individually connected with said bus means for communicating with one another,
   d) timing controlling means outputting a timing signal,
   e) address controlling means receiving said pieces of address information supplied from said main controlling means, and responsive to said timing signal for sequentially supplying said pieces of address information through said bus means to said component units at predetermined timings, said address controlling means further comprising memory means for storing said pieces of address information, and for cyclically reading said pieces of address information out from said memory means to said address bus in response to said timing signal, said memory means including a plurality of random access memories, said main controlling means being operative to rewrite one of said random access memories while the pieces of address information are read out from another of said random access memories, to thereby selectively and simultaneously read out and rewrite said pieces of address information stored in said plurality of random access memories in response to said timing signal, f) each of said plurality of component units further including a means for receiving each of said pieces of address information from said address controlling means and for checking each of said pieces of address information to determine whether the individual address assigned thereto matches said first address or said second address, and g) each of said plurality of component units further including means for supplying data to said data bus when said first address matches said individual address assigned thereto and for receiving data from said data bus in response to said mode information when said second address matches said individual address assigned thereto.

2. A data transmission system as set forth in claim 1, wherein said address controlling means further comprises:

switching means for switching said one of said random access memories to be read out.

3. A data transmission system as set forth in claim 1, in which one of said component units is an analog-to-digital converting unit, and in which one of said pieces of address information includes first and second addresses identical with those of a subsequent piece of address information, wherein a time interval between said one of said pieces of address information and said subsequent piece of address information is equal to a sampling period of said analog-to-digital converting unit.

4. A data transmission system as set forth in claim 3, in which said data transmission system is a sound synthesizing and recording/reproducing system of an electronic musical instrument.

5. A data transmission system as set forth in claim 1, in which one of said pieces of address information includes first and second addresses identical with first and second addresses of another piece of address information.

6. A data transmission system as set forth in claim 1, in which said address controlling means further comprises:

watching means for watching operational states of said component units, such that if a component unit continues to operate, said watching means interrupts said sequential supplying of said pieces of address information.

7. A data transmission system as set forth in claim 6, in which each of said component units further includes:

a driver unit supplying a busy signal indicative of a continuation of operation of said component unit itself, and in which said watching means interrupts said sequential supplying when said busy signal is present at said predetermined timings.

8. A data transmission system comprising:

a) main controlling means for providing pieces of address information, each piece of address information including a first address for a data source and a second address for a data destination, said main controlling means further providing mode information indicative of information included in said second address, b) bus means having an address bus and a data bus, c) a plurality of component units assigned individual addresses, and broadcasting data, respectively, and individually connected with said bus means for communicating with one another, d) timing controlling means outputting a timing signal, e) address controlling means receiving said pieces of address information supplied from said main controlling means, and responsive to said timing signal for sequentially supplying said pieces of address information through said bus means to said component units at predetermined timings, f) each of said plurality of component units further including a means for receiving each of said pieces of address information from said address controlling means and for checking each of said pieces of address information to determine whether the individual address assigned thereto matches said first address or said second address, and g) each of said plurality of component units further including means for supplying data to said data bus when said first address matches said individual address assigned thereto and for receiving data from said data bus in response to said mode information when said second address matches said individual address assigned thereto, wherein one of said component units is an analog-to-digital converting unit, and one of said pieces of address information includes first and second addresses identical with those of a subsequent piece of address information, and wherein a time interval between said one of said pieces of address information and said subsequent piece of address information is equal to a sampling period of said analog-to-digital converting unit.

9. A data transmission system as set forth in claim 8, in which said data transmission system is a sound synthesizing and recording/reproducing system.

10. A data transmission system as set forth in claim 8, in which one of said pieces of address information includes first and second addresses identical with first and second addresses of another piece of address information.

11. A data transmission system as set forth in claim 8, in which said address controlling means further comprises:

watching means for watching operational states of said component units, such that if a component unit continues to operate, said watching means interrupts said sequential supplying of said pieces of address information.

12. A data transmission system as set forth in claim 8, in which each of said component units further includes:

a driver unit supplying a busy signal indicative of a continuation of operation of said component unit itself, and in which said watching means interrupts said sequential supplying when said busy signal is present at said predetermined timings.

* * * * *

UNITED STATES PATENT AND TRADEMARK OFFICE
CERTIFICATE OF CORRECTION

PATENT NO. : 5,559,962
DATED : September 24, 1996
INVENTOR(S) : Yasuhiko OKAMURA, et al.

It is certified that error appears in the above-indentified patent and that said Letters Patent is hereby corrected as shown below:

Title page , item [75] "Yashikoi Okamura" is changed to --Yasuhiko Okamura--.

Signed and Sealed this

Fifteenth Day of April, 1997

Attest:

BRUCE LEHMAN

Attesting Officer

Commissioner of Patents and Trademarks